US009399470B2

(12) United States Patent
Koumura

(10) Patent No.: US 9,399,470 B2
(45) Date of Patent: Jul. 26, 2016

(54) VEHICLE STATE ESTIMATING DEVICE, VEHICLE CONTROL DEVICE, AND VEHICLE STATE ESTIMATING METHOD

(71) Applicant: TOYOTA JIDOSHA KABUSHIKI KAISHA, Toyota-shi, Aichi (JP)

(72) Inventor: Shingo Koumura, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/642,881

(22) Filed: Mar. 10, 2015

(65) Prior Publication Data
US 2015/0258975 A1    Sep. 17, 2015

(30) Foreign Application Priority Data
Mar. 11, 2014  (JP) ................................. 2014-048159

(51) Int. Cl.
*B60W 40/00*    (2006.01)
*B60W 40/11*    (2012.01)

(52) U.S. Cl.
CPC ......... *B60W 40/11* (2013.01); *B60W 2510/227* (2013.01); *B60W 2520/10* (2013.01); *B60W 2520/28* (2013.01)

(58) Field of Classification Search
USPC ........................................................... 701/37
See application file for complete search history.

(56) References Cited

U.S. PATENT DOCUMENTS

| 4,779,853 A | * | 10/1988 | Sugino | ................. B60K 5/1241 180/300 |
| 5,037,119 A | * | 8/1991 | Takehara | ........... B60G 17/0163 180/415 |
| 2011/0202235 A1 | * | 8/2011 | Oikawa | ................. B60W 30/20 701/36 |
| 2014/0095024 A1 | * | 4/2014 | Hirao | ................... B60G 17/018 701/37 |
| 2015/0046033 A1 | | 2/2015 | Yoshimi et al. | |
| 2015/0183289 A1 | | 7/2015 | Koumura | |

FOREIGN PATENT DOCUMENTS

| JP | 5-319051 A | 12/1993 |
| JP | 06-048139 A | 2/1994 |
| JP | 7232532 | 9/1995 |
| JP | 2015-123895 A | 7/2015 |
| WO | 2013121569 A1 | 8/2013 |

* cited by examiner

*Primary Examiner* — Yonel Beaulieu
(74) *Attorney, Agent, or Firm* — Sughrue Mion, PLLC

(57) ABSTRACT

A vehicle state estimating device for estimating the state amount of the vehicle at high accuracy from the wheel speed irrespective of the change in the vehicle property. A vehicle state estimating device includes a wheel speed detection unit that detects a wheel speed of each vehicle wheel; a vehicle speed detection unit that detects a vehicle speed; and a state amount estimation unit that estimates an unsprung state amount and/or a sprung state amount of the vehicle, based on a wheel speed of reverse phase of left and right wheels based on the wheel speed of each wheel detected by the wheel speed detection unit, and a value obtained by dividing a wheel base of a predetermined front-rear wheel by the vehicle speed detected by the vehicle speed detection unit.

5 Claims, 8 Drawing Sheets

FRONT AND BACK
DIRECTION OF
VEHICLE

FRONT AND BACK
DIRECTION OF
VEHICLE

1
VEHICLE STATE ESTIMATING DEVICE, VEHICLE CONTROL DEVICE, AND VEHICLE STATE ESTIMATING METHOD

CROSS-REFERENCE TO RELATED APPLICATIONS

The present application claims priority to and incorporates by reference the entire contents of Japanese Patent Application No. 2014-048159 filed in Japan on Mar. 11, 2014.

BACKGROUND OF THE INVENTION

1. Field of the Invention

The present invention relates to a vehicle state estimating device, a vehicle control device, and a vehicle state estimating method.

2. Description of the Related Art

A technique of estimating a state amount of a vehicle from a wheel speed has been conventionally reported.

For example, Japanese Patent Application Laid-Open No. H5-319051 discloses a roll detection device for detecting a rotation movement about a front-back axis of a vehicle, the roll detection device including first and second wheel speed detection units for detecting wheel speeds on the left and right of the vehicle, respectively; first and second wheel speed fluctuation amount extracting units for obtaining a fluctuation amount of the wheel speed of a sprung resonance frequency region for each of the left and right wheels based on the detected speeds of the left and right wheels; and a roll computing unit for computing a magnitude of the rotation movement about the front-back axis of the vehicle based on a reverse phase component of the obtained fluctuation amount for the left and right wheels.

In the conventional technique, a transmission property of a sprung unsprung behavior with respect to each input (road surface, steering, accelerator, brake, etc.) is necessary, which transmission property changes by a vehicle state (load state, etc.). Thus, in the conventional technique, when estimating the state amount of the vehicle from the wheel speed, the vehicle property (transmission property of the sprung behavior with respect to the unsprung behavior, etc.) changes by the change in the vehicle state (change in load state, etc.) and thus a highly accurate estimation is difficult. Therefore, improvements still can be made in the conventional technique in enhancing the accuracy of when estimating the state amount of the vehicle from the wheel speed.

SUMMARY OF THE INVENTION

The present invention has been made considering the above circumstances, and an object thereof is to provide a vehicle state estimating device, a vehicle control device, and a vehicle state estimating method capable of estimating the state amount of the vehicle at high accuracy from the wheel speed irrespective of the change in the vehicle property.

It is an object of the present invention to at least partially solve the problems in the conventional technology.

The object of the present invention can be achieved by the following configurations.

According to one aspect of the present invention, a vehicle state estimating device includes a wheel speed detection unit configured to detect a wheel speed of each wheel of a vehicle; a vehicle speed detection unit configured to detect a vehicle speed of the vehicle; and a state amount estimation unit configured to estimate an unsprung state amount and/or a sprung state amount of the vehicle, based on a wheel speed of reverse phase of left and right wheels based on the wheel speed of each wheel detected by the wheel speed detection unit, and a value obtained by dividing a wheel base of a predetermined front-rear wheel by the vehicle speed detected by the vehicle speed detection unit.

According to another aspect of the present invention, the state amount estimation unit (i) converts, as the wheel speed of the reverse phase of the left and right wheels, [Formula 1], which represents a wheel speed of the reverse phase of the left and right wheels at a front wheel position and a wheel speed of the reverse phase of the left and right wheels at a rear wheel position to [Formula 2] using the value obtained by dividing the wheel base of the predetermined front-rear wheel by the vehicle speed, (ii) estimates, as the unsprung state amount, an up-down displacement of the reverse phase of the left and right wheels of an unsprung portion of the front wheel of the vehicle indicated in [Formula 3] and an up-down displacement of the reverse phase of the left and right wheels of an unsprung portion of the rear wheel of the vehicle indicated in [Formula 4], from the [Formula 2], and (iii) estimates, as the sprung state amount, a sprung roll angle of the vehicle indicated in [Formula 5].

$$\Delta\omega_F = \frac{-\Delta\omega_1 + \Delta\omega_2}{2} = $$
$$-(\alpha_{XF}/r_F - \alpha_{\theta F})W_F\dot{\varphi}_{RG} + (\alpha_{XF}/r_F - \alpha_{\theta F})\left(\frac{-\dot{Z}_{A1} + \dot{Z}_{A2}}{2}\right)$$

$$\Delta\omega_R = \frac{-\Delta\omega_3 + \Delta\omega_4}{2} = $$
$$-(\alpha_{XR}/r_R - \alpha_{\theta R})W_R\dot{\varphi}_{BG} + (\alpha_{XR}/r_R - \alpha_{\theta R})\left(\frac{-\dot{Z}_{A3} + \dot{Z}_{A4}}{2}\right)$$

[Formula 1]

$$\Delta\omega_F = -(\alpha_{XF}/r_F - \alpha_{\theta F})W_F\dot{\varphi}_{BG} + (\alpha_{XF}/r_F - \alpha_{\theta F})\dot{Z}_{AF}$$
$$\Delta\omega_R = -(\alpha_{XR}/r_R - \alpha_{\theta R})W_R\dot{\varphi}_{BG} + (\alpha_{XR}/r_R - \alpha_{\theta R})\dot{Z}_{AF}e^{-\frac{L}{U}s}$$
$$\text{Where } \dot{Z}_{AF} = \frac{-\dot{Z}_{A1} + \dot{Z}_{A2}}{2}, \dot{Z}_{AR} = \frac{-\dot{Z}_{A3} + \dot{Z}_{A4}}{2} \cong \dot{Z}_{AF}e^{-\frac{L}{U}s}$$

[Formula 2]

$$\dot{Z}_{AF} = \frac{\frac{\Delta\omega_F}{W_F(\alpha_{XF}/r_F - \alpha_{\theta F})} - \frac{\Delta\omega_R}{W_R(\alpha_{XR}/r_R - \alpha_{\theta R})}}{\frac{1}{W_F} - \frac{1}{W_R}e^{-\frac{1}{U}s}}$$

[Formula 3]

$$\dot{Z}_{AR} = \dot{Z}_{AF}e^{-\frac{1}{U}s}$$

[Formula 4]

$$\dot{\varphi}_{BG} = \frac{(\alpha_{XF}/r_F - \alpha_{\theta F})\dot{Z}_{AF} - \Delta\omega_F}{W_F(\alpha_{XF}/r_F - \alpha_{\theta F})}$$

[Formula 5]

(In the [Formula 1] to the [Formula 5], $\Delta\omega_F$: wheel speed of the reverse phase of the left and right wheels at a front wheel position; $\Delta\omega_R$: wheel speed of the reverse phase of the left and right wheels at a rear wheel position; $\Delta\omega_1$: wheel speed of an FR wheel; $\Delta\omega_2$: wheel speed of an FL wheel; $\Delta\omega_3$: wheel speed of an RR wheel; $\Delta\omega_4$: wheel speed of an RL wheel; $\alpha_{XF}$, $\alpha_{XR}$: axle front-back displacement with respect to a suspension up-down stroke; $\alpha_{\theta F}$, $\alpha_{\theta R}$: axle pitch angle with respect to the suspension up-down stroke; $r_F$, $r_R$: tire radius (front wheel, rear wheel); $W_F$, $W_R$: left-right distance (half of trestle) from an axle position to a body gravity center; $\varphi_{BG}$: sprung roll angle; $Z_{A1}$ to $Z_{A4}$: up-down displacement fluctuation amount of the unsprung portion of each wheel of front right, front left, rear right, rear left; $Z_{AF}$: up-down displacement of the reverse phase of the left and right wheels of the unsprung portion of the front wheel; $Z_{AR}$: up-down displacement of the reverse phase of the left and right wheels of the unsprung portion of the rear wheel; L: wheel base; U: vehicle speed; and s: Laplace operator)

According to still another aspect of the present invention, the vehicle state estimating device further includes a load state estimation unit configured to (i) calculate a roll resonance frequency and a maximum value of a transfer function of the sprung state amount with respect to the unsprung state amount, based on the up-down displacement of the reverse phase of the left and right wheels of the unsprung portion of the front wheel, the up-down displacement of the reverse phase of the left and right wheels of the unsprung portion of the rear wheel, and the sprung roll angle which are estimated by the state amount estimation unit, and (ii) estimate a load state of the vehicle, based on the calculated roll resonance frequency and the maximum value of the transfer function.

According to still another aspect of the present invention, a vehicle control device includes a wheel speed detection unit configured to detect a wheel speed of each wheel of a vehicle; a vehicle speed detection unit configured to detect a vehicle speed of the vehicle; a state amount estimation unit configured to estimate an unsprung state amount and/or a sprung state amount of the vehicle, based on a wheel speed of reverse phase of left and right wheels based on the wheel speed of each wheel detected by the wheel speed detection unit, and a value obtained by dividing a wheel base of a predetermined front-rear wheel by the vehicle speed detected by the vehicle speed detection unit; and a control unit configured to control a suspension device of the vehicle based on the unsprung state amount and/or the sprung state amount estimated by the state amount estimation unit.

According to still another aspect of the present invention, a vehicle state estimating method includes a wheel speed detecting step of detecting a wheel speed of each wheel of a vehicle; a vehicle speed detecting step of detecting a vehicle speed of the vehicle; and a state amount estimating step of estimating an unsprung state amount and/or a sprung state amount of the vehicle, based on a wheel speed of reverse phase of left and right wheels based on the wheel speed of each wheel detected in the wheel speed detecting step, and a value obtained by dividing a wheel base of a predetermined front-rear wheel by the vehicle speed detected in the vehicle speed detecting step.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A vehicle state estimating device, a vehicle control device, and a vehicle state estimating method according to an embodiment of the present invention will be hereinafter described in detail with reference to the drawings. It should be recognized that the present invention is not to be limited by the embodiments. The configuring elements in the following embodiment include configuring elements easily contrived by those skilled in the art or substantially the same configuring elements.

Embodiment

Figure 1:
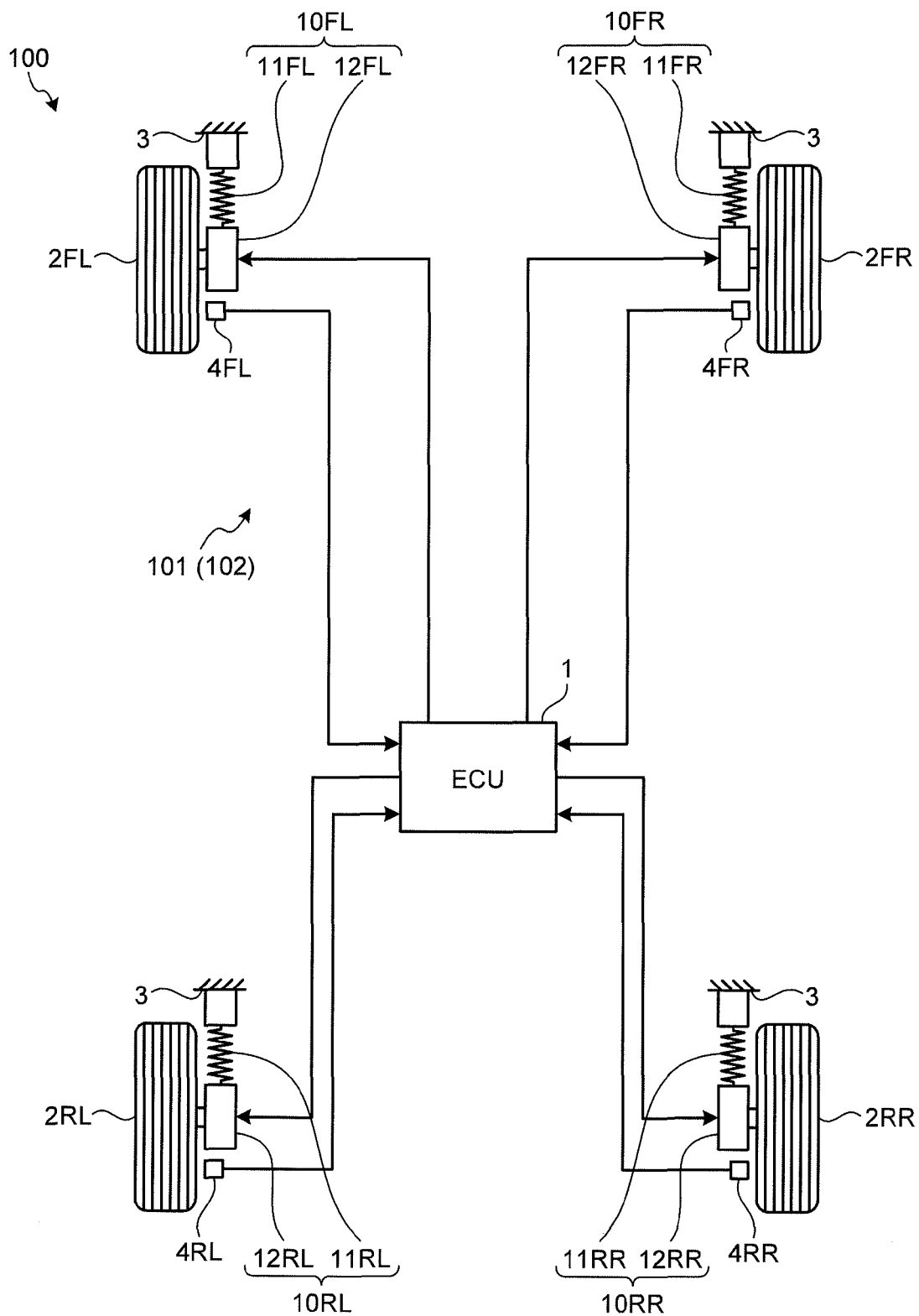
FIG. 1 is a schematic configuration diagram of a vehicle according to an embodiment.
Figure 2:
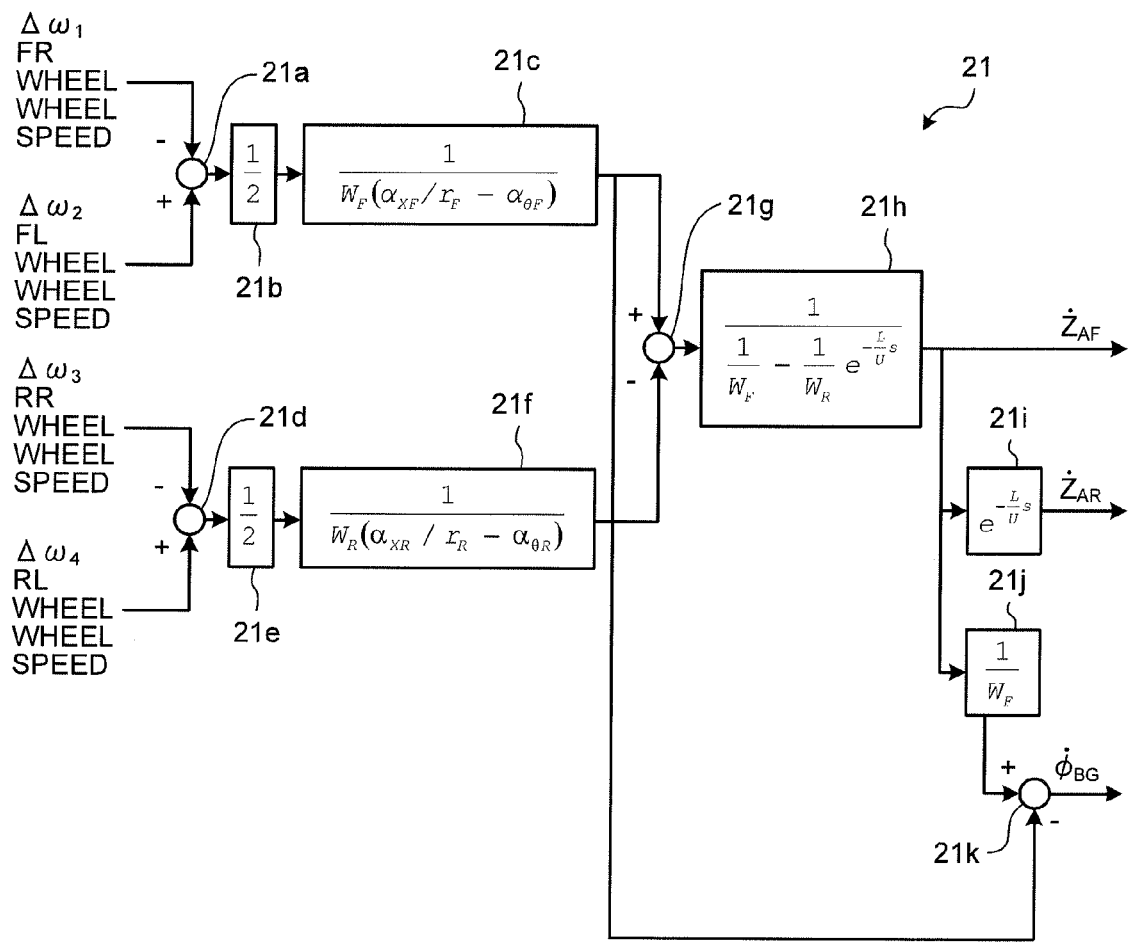
FIG. 2 is a block diagram of a vehicle state estimating device according to the embodiment.
Figure 3:
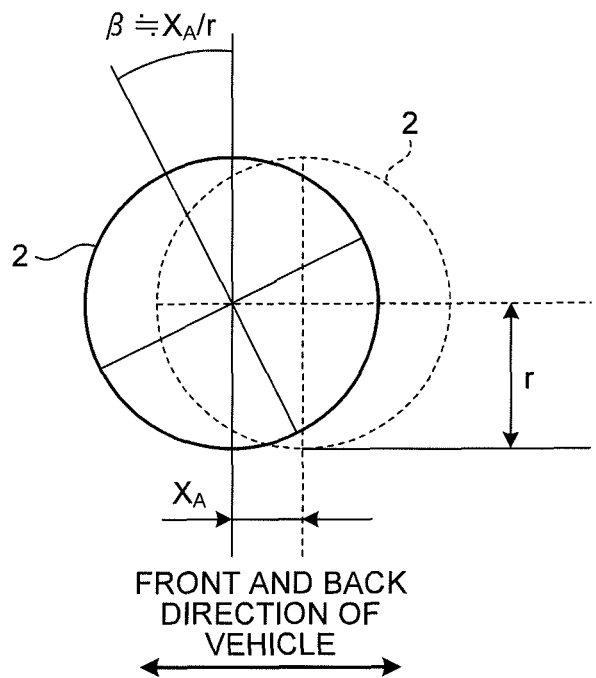
FIG. 3 is a view describing a fluctuation amount of a rotation angle of a wheel.
Figure 4:
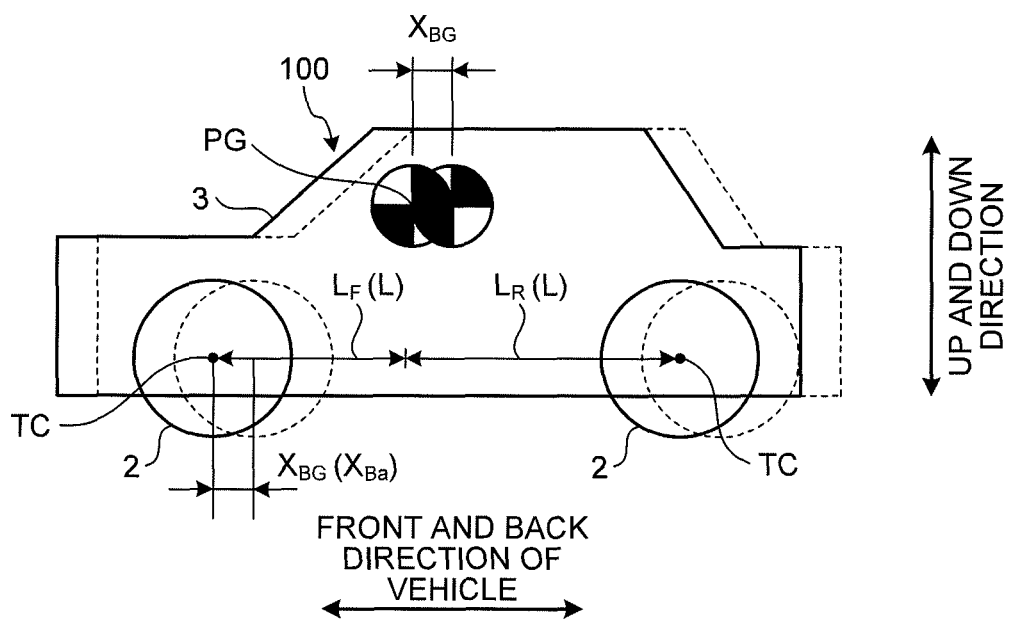
FIG. 4 is an explanatory view of a front-back displacement fluctuation amount.
Figure 5:
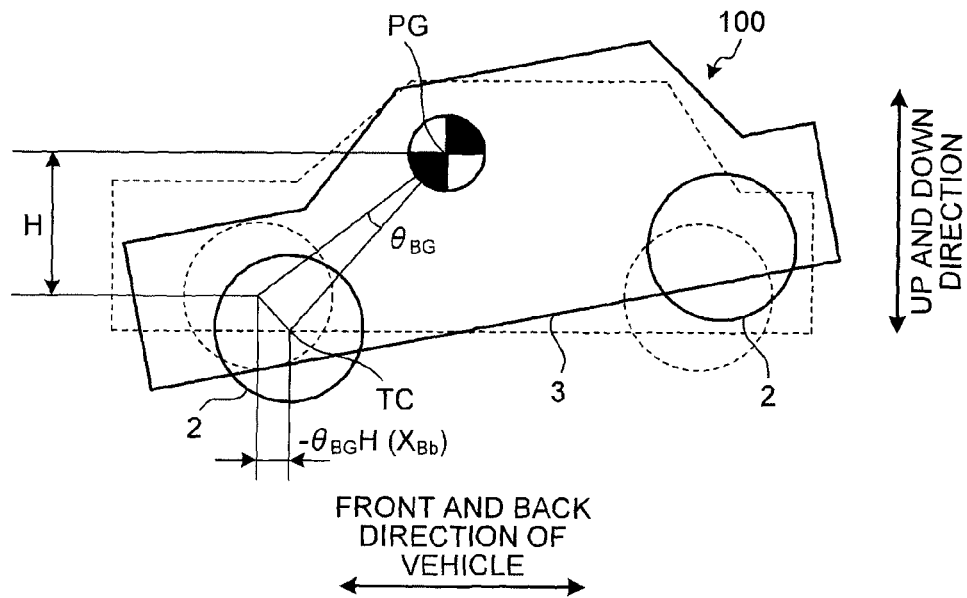
FIG. 5 is an explanatory view of a front-back displacement fluctuation amount by pitching.
Figure 6:
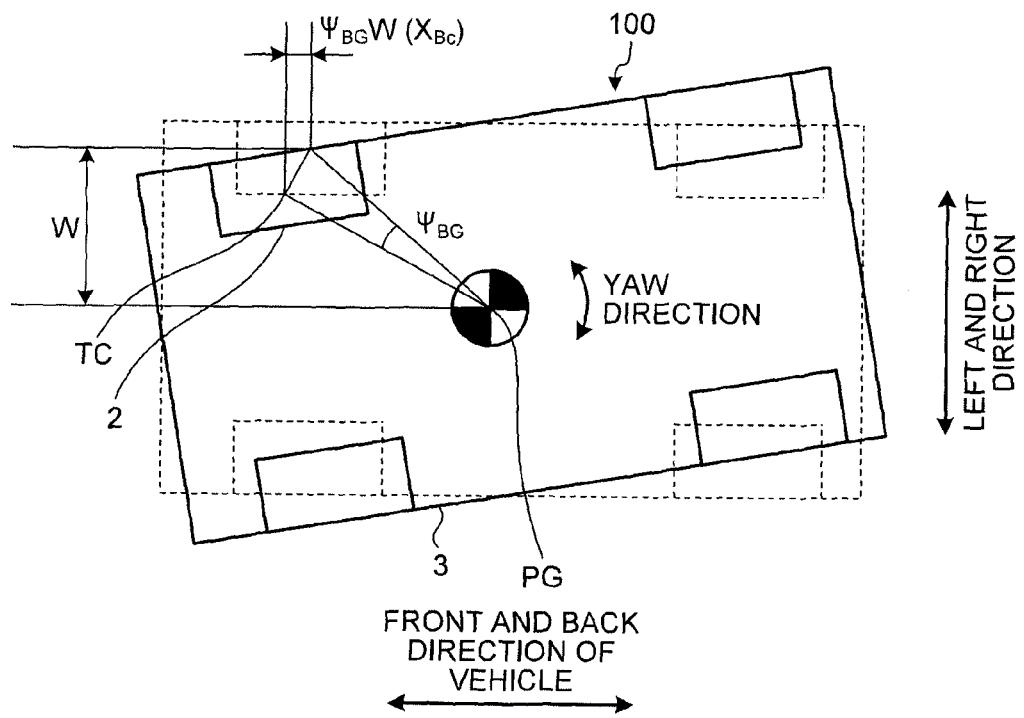
FIG. 6 is an explanatory view of a front-back displacement fluctuation amount by a rotation of the vehicle.
Figure 7:
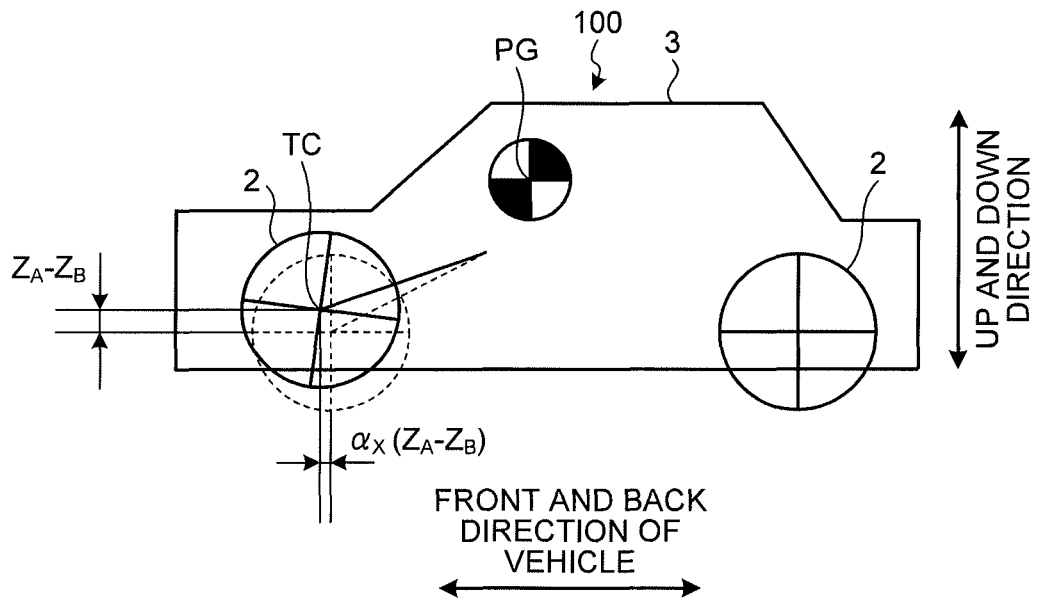
FIG. 7 is an explanatory view of a front-back displacement fluctuation amount by a stroke of a suspension device.
Figure 8:
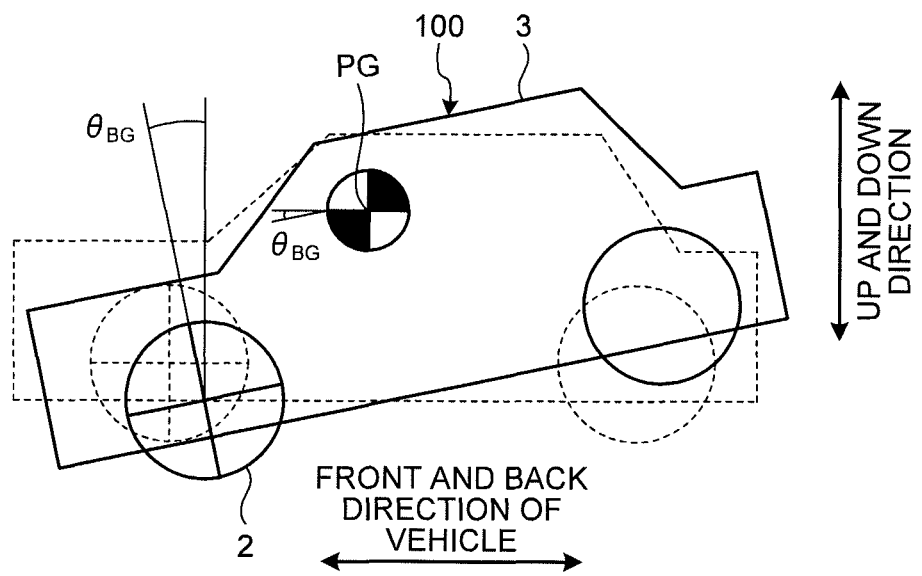
FIG. 8 is an explanatory view of an unsprung pitch angle by the pitching.
Figure 9:
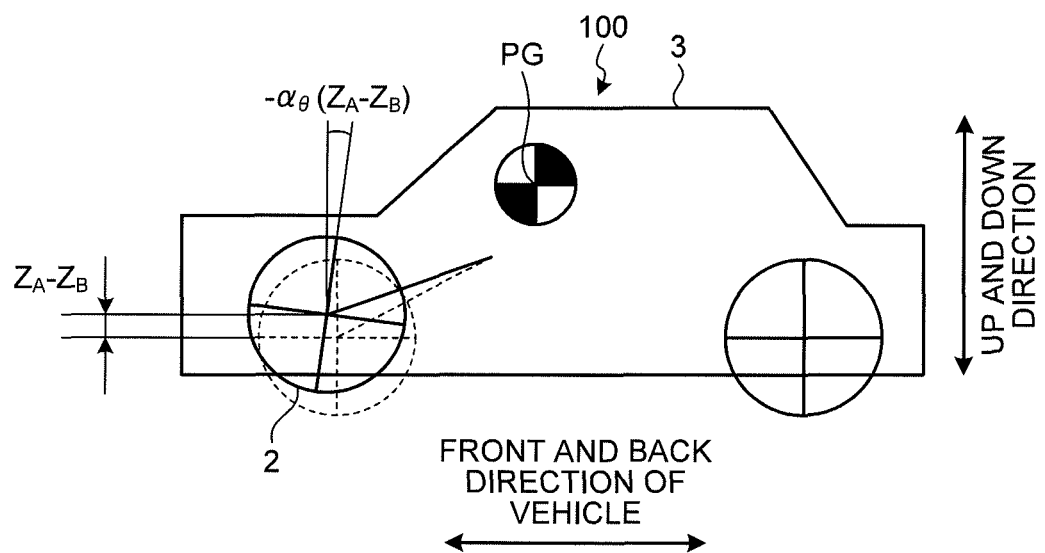
FIG. 9 is an explanatory view of the unsprung pitch angle by the stroke of the suspension device.
Figure 10:
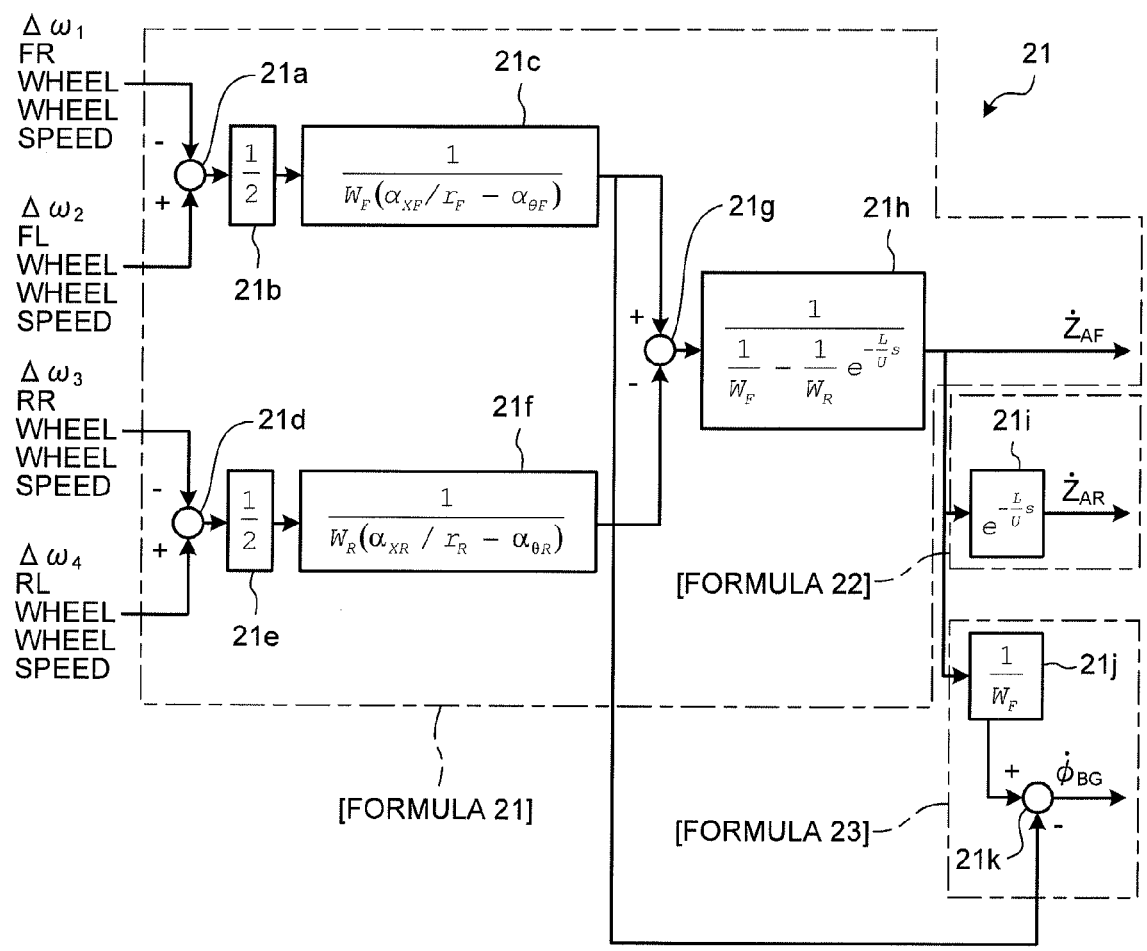
FIG. 10 is a view illustrating a correspondence of the block diagram of the vehicle state estimating device of FIG. 2 and a theoretical formula according to the embodiment of the present invention.
Figure 11:
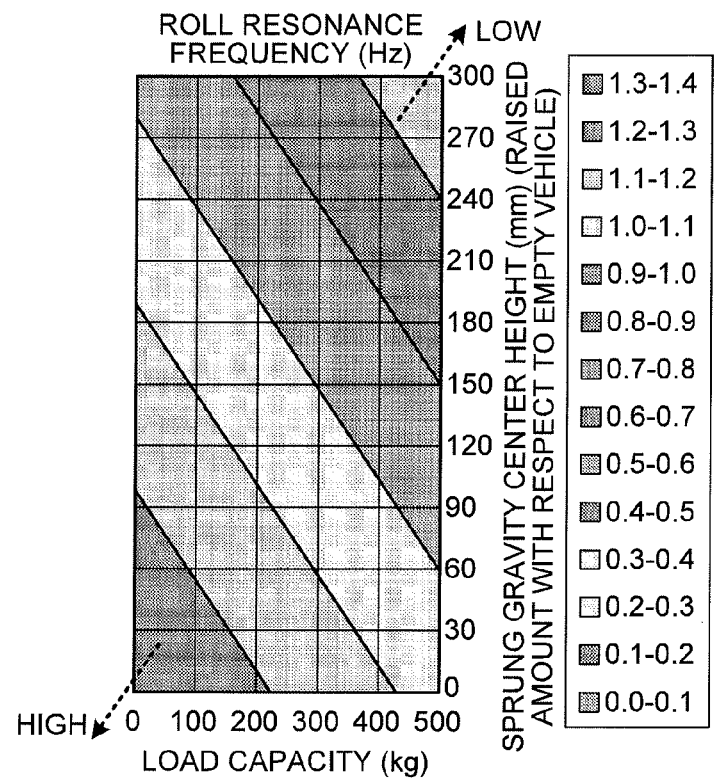
FIG. 11 is a view illustrating a relationship of a load capacity, a gravity center height, and a roll resonance frequency.
Figure 12:
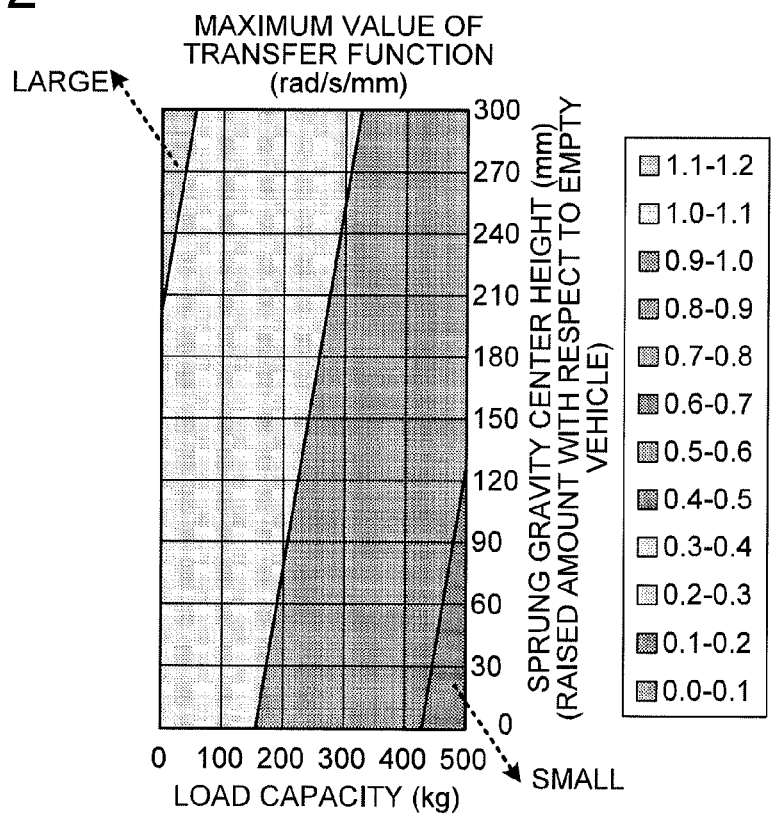
FIG. 12 is a view illustrating a relationship of the load capacity, the gravity center height, and a maximum value of a transfer function.

An embodiment will be described with reference to FIGS. 1 to 12. The present embodiment relates to a vehicle state estimating device, a vehicle control device, and a vehicle state estimating method. FIG. 1 is a is a schematic configuration diagram of a vehicle according to an embodiment. FIG. 2 is a block diagram of a vehicle state estimating device according to the embodiment of the present invention. FIG. 3 is a view describing a fluctuation amount of a rotation angle of a wheel. FIG. 4 is an explanatory view of a front-back displacement fluctuation amount. FIG. 5 is an explanatory view of a front-back displacement fluctuation amount by pitching. FIG. 6 is an explanatory view of a front-back displacement fluctuation amount by a rotation of the vehicle. FIG. 7 is an explanatory view of a front-back displacement fluctuation amount by a stroke of a suspension device. FIG. 8 is an explanatory view of an unsprung pitch angle by the pitching. FIG. 9 is an explanatory view of the unsprung pitch angle by the stroke of the suspension device. FIG. 10 is a view illustrating a correspondence of the block diagram of the vehicle state estimating device of FIG. 2 and a theoretical formula according to the embodiment of the present invention. FIG. 11 is a view illustrating a relationship of a load capacity, a gravity center height, and a roll resonance frequency. FIG. 12 is a view illustrating a relationship of the load capacity, the gravity center height, and a maximum value of a transfer function.

A vehicle state estimating device 101 according to the present embodiment utilizes the characteristic that the relationship of the wheel speeds of the reverse phase of the left and right wheels, and the sprung and unsprung behavior is not influenced by the vehicle property (unsprung mass, etc.), and estimates the unsprung•sprung behavior of the reverse phase of the left and right wheels from the wheel speeds of the reverse phase of the left and right wheels. The vehicle state estimating device 101 according to the present embodiment calculates a transfer function of a sprung portion with respect to an unsprung portion from the estimated unsprung•sprung behavior of the reverse phase of the left and right wheels, estimates the load state, and the like of the vehicle from the transfer function, and reflects the same on a model setting of a suspension control and a brake control. The details will be described below.

A vehicle 100 according to the present embodiment will be described with reference to FIG. 1. As illustrated in FIG. 1, the vehicle 100 is configured to include the vehicle state estimating device 101, a wheel 2 (2FR, 2FL, 2RR, 2RL), and a suspension device 10 (10FR, 10FL, 10RR, 10RL). The vehicle state estimating device 101 of the present embodiment is configured to include at least an ECU 1 (has a function of a state amount estimation unit and a load state estimation unit, to be described later), and a wheel speed detection unit 4 (4FR, 4FL, 4RR, 4RL). As will be described later, the ECU 1 of the present embodiment has a function of a control unit for controlling the suspension device 10 (10FR, 10FL, 10RR, 10RL). Therefore, the vehicle 100 is mounted with a vehicle control device 102 including the ECU 1 and the wheel speed detection unit 4.

The vehicle 100 includes, for the wheel 2, a front right wheel 2FR, a front left wheel 2FL, a rear right wheel 2RR, and a rear left wheel 2RL. The vehicle 100 also includes, for the suspension device 10, a front right suspension device 10FR, a front left suspension device 10FL, a rear right suspension device 10RR, and a rear left suspension device 10RL. In the present specification, a suffix FR of a reference symbol of each configuring element indicates association to the right front wheel 2FR. Similarly, a suffix FL of a reference symbol indicates association to the front left wheel 2FL, a suffix RR indicates association to the rear right wheel 2RR, and a suffix RL indicates association to the rear left wheel 2RL.

The suspension device 10 connects the unsprung portion and the sprung portion. Here, the unsprung portion includes front and rear arm members, a knuckle, and the like, and is a portion connected to the wheel 2 side with respect to the suspension device 10 in the vehicle 100. The sprung portion is a portion supported by the suspension device 10 in the vehicle 100, and is, for example, a body 3. The suspension device 10 tolerates the relative displacement of the sprung portion and the unsprung portion by extending and contracting. The suspension device 10 is arranged inclined at a predetermined angle with respect to a vertical axis, for example.

The suspension device 10 is configured to include a shock absorber 11 (11FR, 11FL, 11RR, 11RL) and a suspension actuator 12 (12FR, 12FL, 12RR, 12RL). The shock absorber 11 generates an attenuating force of attenuating the relative movement of the sprung portion and the unsprung portion. The suspension actuator 12 adjusts the attenuating force (attenuation coefficient) generated by the shock absorber 11. The suspension actuator 12 can change the attenuating property of the shock absorber 11 to an arbitrary property from a relatively soft attenuating property (small attenuating force) to a relatively hard attenuating property (large attenuating force).

Each wheel 2FR, 2FL, 2RR, 2RL includes the wheel speed detection unit 4 (4FR, 4FL, 4RR, 4RL) for detecting the respective wheel speed. The front right wheel speed detection unit 4FR detects the wheel speed of the front right wheel 2FR. Similarly, the front left wheel speed detection unit 4FL, the rear right wheel speed detection unit 4RR, and the rear left wheel speed detection unit 4RL respectively detect the wheel speed of the front left wheel 2FL, the rear right wheel 2RR, and the rear left wheel 2RL. A signal indicating the detection result of each of the wheel speed detection units 4FR, 4FL, 4RR, 4RL is output to the ECU 1.

The ECU 1 of the present embodiment is an electronic control unit including a computer. The ECU 1 has a function serving as each estimation unit for estimating the vehicle state. The ECU 1 is electrically connected to the suspension device 10 of each wheel 2FR, 2FL, 2RR, 2RL to control the suspension device 10.

The function of the ECU 1 of the present embodiment will be described with reference to FIG. 2. In FIG. 2, $\Delta\omega_1$ to $\Delta\omega_4$ indicate each wheel speed fluctuation. $\Delta\omega_1$ indicates a wheel speed of the FR wheel. $\Delta\omega_2$ indicates a wheel speed of the FL wheel. $\Delta\omega_3$ indicates a wheel speed of the RR wheel. $\Delta\omega_4$ indicates a wheel speed of the RL wheel. $Z_{AF}$ indicates an up-down displacement of the reverse phase of the left and right wheels of the unsprung portion of the front wheel. $Z_{AR}$ indicates an up-down displacement of the reverse phase of the left and right wheels of the unsprung portion of the rear wheel. $\phi_{BG}$ indicates a sprung roll angle. $W_F$, $W_R$ indicates a left-right distance (half of trestle) from the axle position to the body gravity center. $\alpha_{XF}$, $\alpha_{XR}$ indicates an axle front-back displacement with respect to the suspension up-down stroke. $\alpha_{\theta F}$, $\alpha_{\theta R}$ indicates an axle pitch angle with respect to the suspension up-down stroke. $r_F$, $r_R$ indicates a tire radius (front wheel, rear wheel). L indicates a wheel base. U indicates a vehicle speed. s indicates a Laplace operator.

As illustrated in the block diagram of FIG. 2, the ECU 1 according to the present embodiment is configured to include a state amount estimation unit 21 for estimating an unsprung state amount ($Z_{AF}$, $Z_{AR}$) and/or a sprung state amount ($\phi_{BG}$) of the vehicle 100 based on a wheel speed "½·($\Delta\omega R - \Delta\omega L$)" of reverse phases of the left and right wheels based on the wheel speed of each wheel 2FR, 2FL, 2RR, 2RL detected by the wheel speed detection unit 4, and a value "L/U" obtained by dividing the wheel base L of a predetermined front-rear wheel by the vehicle speed U of the vehicle 100 detected by the vehicle speed detection unit for detecting the vehicle speed of the vehicle 100. Although not illustrated in FIG. 2, the vehicle speed detection unit for detecting the vehicle speed of the vehicle 100 is a part of a processing section of the ECU 1. In the present embodiment, the vehicle speed detection unit may detect the vehicle speed of the vehicle 100 based on the wheel speed of each wheel 2FR, 2FL, 2RR, 2RL detected by the wheel speed detection unit 4, or may detect the vehicle speed of the vehicle 100 based on an integrated value, and the like of the front-back acceleration other than the wheel speed. The dot (•) symbol above the character indicates a derivative value.

The state amount estimation unit 21 includes estimation units 21a to 21k. The estimation unit 21a adds the wheel speed ($\Delta\omega_1$ FR wheel speed in FIG. 2) of the wheel 2FR detected by the wheel speed detection unit 4, and the wheel speed ($\Delta\omega_2$ FL wheel speed in FIG. 2) of the wheel 2FL detected by the wheel speed detection unit 4. In this case, the estimation unit 21a adds a negative value ($-\Delta\omega_1$) for the value of the wheel speed of the wheel 2FR. The estimation unit 21b multiplies "½" to the value "$-\Delta\omega_1 + \Delta\omega_2$" obtained by the estimation unit 21a, and the estimation unit 21c further multiplies "$1/(W_F(\alpha_{XF}/r_F - \alpha_{\theta F}))$" to the value "$(-\Delta\omega_1 + \Delta\omega_2)/2$" obtained by the estimation unit 21b.

The estimation unit 21d adds the wheel speed ($\Delta\omega_3$ RR wheel speed in FIG. 2) of the wheel 2RR detected by the wheel speed detection unit 4, and the wheel speed ($\Delta\omega_4$ RL wheel speed in FIG. 2) of the wheel 2RL detected by the wheel speed detection unit 4. In this case, the estimation unit 21d adds a negative value ($-\Delta\omega_3$) for the value of the wheel speed of the wheel 2RR. The estimation unit 21e multiplies "½" to the value "$-\Delta\omega_3 + \Delta\omega_4$" obtained by the estimation unit 21d, and the estimation unit 21f further multiplies "$1/(W_R(\alpha_{XR}/r_R - \alpha_{\theta R}))$" to the value "$(-\Delta\omega_3 + \Delta\omega_4)/2$" obtained by the estimation unit 21e.

The estimation unit 21g subtracts the value "{(−Δω₃+Δω₄)/2}·{1/(W_R(α_{XR}/r_R−α_{θR}))}" obtained by the estimation unit 21f from the value "{(−Δω₁+Δω₂)/2}·{1/(W_F(α_{XF}/r_F−α_{θF}))}" obtained by the estimation unit 21c. The estimation unit 21h multiplies "1/{(1/W_F)−(1/W_R)e^−L/U·s}" to the value obtained by the estimation unit 21g to obtain the up-down displacement ($Z_{AF}$) of the reverse phase of the left and right wheels of the unsprung portion of the front wheel of the vehicle 100 as the unsprung state amount of the vehicle 100. Furthermore, the estimation unit 21i multiplies "e^−L/U·s" to the value obtained by the estimation unit 21h to obtain the up-down displacement ($Z_{AR}$) of the reverse phase of the left and right wheels of the unsprung portion of the rear wheel of the vehicle 100 as the unsprung state amount of the vehicle 100. The estimation unit 21j subtracts the value obtained by the estimation unit 21c from the value obtained by multiplying "1/W_F" to the value obtained by the estimation unit 21h to obtain the sprung roll angle ($\phi_{BG}$) of the vehicle 100 as the sprung state amount of the vehicle 100. The ECU 1 of the present embodiment controls the suspension device 10 based on the estimated unsprung state amount of the vehicle 100 and/or sprung state amount of the vehicle 100.

Now, details of the estimating process of the unsprung state amount ($Z_{AF}$, $Z_{AR}$) and the sprung state amount ($\phi_{BG}$) of the vehicle 100 by the state amount estimation unit 21 of the present embodiment will be described.

First, details will be described from a theoretical formula related to the estimation of the vehicle state amount by the vehicle state estimating device 101 of the present embodiment. A tire rotation speed fluctuation amount ω can be calculated with the following [Formula 6]. The tire rotation speed fluctuation amount ω is a fluctuation amount of the rotation speed of the wheel 2. The tire rotation speed fluctuation amount ω is the fluctuation amount of the rotation speed with respect to the rotation speed of the wheel 2 corresponding to the current vehicle speed, and is, for example, the fluctuation amount generated by the road surface input and the behavior of the sprung portion. In other words, the tire rotation speed fluctuation amount ω is the fluctuating portion (dynamic fluctuating portion) with respect to the steadily moving portion. As will be described below with reference to FIG. 3, the tire rotation speed fluctuation amount ω can be expressed as the [Formula 6] by a radius r of the wheel 2 and a front-back displacement fluctuation amount $X_A$ of the unsprung portion.

$$\omega = \dot{X}_A/r = [\dot{X}_B + (\dot{X}_A - \dot{X}_B)]/r \quad \text{[Formula 6]}$$

The position of the wheel 2 indicated with a broken line in FIG. 3 is the wheel position of when the wheel 2 steadily moved, and is, for example, the wheel position at a certain predetermined time determined according to the vehicle speed. The position of the wheel 2 indicated with a solid line indicates the actual wheel position at the predetermined time. The fluctuation of the position in the front and back direction of the vehicle occurs between the wheel position indicated with the broken line and the wheel position indicated with the solid line by the road surface input and the operation input. The fluctuation of the wheel position in the front and back direction of the vehicle corresponds to the front-back displacement fluctuation amount $X_A$ of the unsprung portion. The fluctuation amount β of the rotation angle of the wheel 2 corresponding to the front-back displacement fluctuation amount $X_A$ of the unsprung portion can be approximated with $X_A/r$, as illustrated in FIG. 3. The tire rotation speed fluctuation amount ω is a value obtained by differentiating the fluctuation amount β of the rotation angle, and thus can be approximately obtained as in the [Formula 6].

A first term in the parentheses on the right side of the [Formula 6] will now be described. The first term is a derivative value of a front-back displacement fluctuation amount $X_B$ of the sprung portion at an axle position TC (see FIG. 4). The axle position TC is a middle point in the width direction of the wheel 2 on the center axis line of each wheel 2. The front-back displacement fluctuation amount $X_B$ of the sprung portion at the axle position TC can be expressed as a sum of a front-back displacement fluctuation amount $X_{BG}$ of the sprung portion (gravity center position PG) illustrated in FIG. 4, a fluctuation amount based on a sprung pitch angle $\theta_{BG}$ illustrated in FIG. 5, and a fluctuation amount based on a sprung yaw angle $\Psi_{BG}$ illustrated in FIG. 6.

As illustrated in FIG. 4, when the sprung portion position fluctuates in the front and back direction of the vehicle, the front-back displacement fluctuation amount $X_B$ of the sprung portion viewed at the axle position TC includes a component $X_{Ba}$ by the position fluctuation in the front and back direction of the vehicle 100 of the sprung portion. The component $X_{Ba}$ by the position fluctuation in the front and back direction of the vehicle 100 is expressed as the front-back displacement fluctuation amount $X_{BG}$ of the sprung portion at the gravity center position PG, as expressed with equation (1) below.

$$X_{Ba} = X_{BG} \quad (1)$$

When pitching occurs in the vehicle 100 as illustrated in FIG. 5, the front-back displacement fluctuation amount $X_B$ of the sprung portion viewed at the axle position TC contains a component $X_{Bb}$ by the pitching. The component $X_{Bb}$ by the pitching is expressed with the following equation (2) based on the sprung pitch angle $\theta_{BG}$. Here, H is a distance in a height direction of the axle position TC and the gravity center position PG.

$$X_{Bb} = -\theta_{BG} \times H \quad (2)$$

When a behavior in a yaw direction (rotation about a vertical axis) occurs in the vehicle 100 as illustrated in FIG. 6, the front-back displacement fluctuation amount $X_B$ of the sprung portion viewed at the axle position TC contains a component $X_{Bc}$ by the behavior in the yaw direction. The component $X_{Bc}$ by the behavior in the yaw direction is expressed with the following equation (3) based on the sprung yaw angle $\Psi_{BG}$. Here, W is a distance between the gravity center position PG and the axle position TC in the vehicle width direction.

$$X_{Bc} = \Psi_{BG} \times W \quad (3)$$

The sum of the above three components $X_{Ba}$, $X_{Bb}$, $X_{Bc}$ is the front-back displacement fluctuation amount $X_B$ of the sprung portion viewed at the axle position TC. That is, equation (4) is derived.

$$X_B = -\theta_{BG} \times H + X_{BG} + \Psi_{BG} \times W \quad (4)$$

Next, a second term in the parentheses on the right side of the [Formula 6] will be described. The second term is a term related to the relative displacement of the sprung portion and the unsprung portion, that is, the up-down stroke of the suspension device 10. The wheel 2 and the body 3, which is the sprung portion, relatively displace in the up and down direction, as illustrated in FIG. 7, by the stroke of the suspension device 10. If the suspension device 10 is inclined in the front and back direction of the vehicle with respect to the up and down direction, the wheel 2 and the body 3 relatively displace also in the front and back direction of the vehicle. A difference ($X_A − X_B$) of the front-back displacement fluctuation amount between the sprung portion and the unsprung portion can be expressed with the following equation (5).

$$X_A - X_B = \alpha_X(Z_A - Z_B) \quad (5)$$

Here, $Z_A$ is the up-down displacement fluctuation amount of the unsprung portion, $Z_B$ is the up-down displacement fluctuation amount of the sprung portion at the axle position TC in the front and back direction of the vehicle, and $\alpha_X$ is the relative displacement amount in the front and back direction of the vehicle of the sprung portion and the unsprung portion per unit stroke amount of the suspension device 10.

The following [Formula 7] is derived from the [Formula 6] and the equations (1) to (5).

$$\omega = [(-\dot{\theta}_{BG}H + \dot{X}_{BG} + \dot{\psi}_{BG}W) + \alpha_X(\dot{Z}_A - \dot{Z}_B)]/r \qquad \text{[Formula 7]}$$

The unsprung pitch angle $\theta_A$ will now be described with reference to FIG. 8 and FIG. 9. The unsprung pitch angle $\theta_A$ is the pitch angle of the unsprung portion, and indicates an inclination angle in the front and back direction of the vehicle of the unsprung portion with respect to the road surface. In the vehicle 100, the sprung pitch angle $\theta_{BG}$ and the unsprung pitch angle $\theta_A$ may differ by the extension and contraction of the suspension device 10. In other words, the unsprung pitch angle $\theta_A$ contains a component $\theta_{Aa}$ corresponding to the sprung pitch angle $\theta_{BG}$ and a component $\theta_{Ab}$ by the extension and contraction of the suspension device 10.

As illustrated in FIG. 8, the component $\theta_{Aa}$ corresponding to the sprung pitch angle $\theta_{BG}$ is equal to the sprung pitch angle $\theta_{BG}$. That is, the component $\theta_{Aa}$ corresponding to the sprung pitch angle $\theta_{BG}$ is expressed with the following equation (6).

$$\theta_{Aa} = \theta_{BG} \qquad (6)$$

FIG. 9 illustrates a state in which the suspension devices 10FR, 10FL of the front wheels 2FR, 2FL of the vehicle 100 are extended and contracted by the road surface input, and the like, and the suspension devices 10RR, 10RL of the rear wheels 2RR, 2RL are not extended or contracted. The component $\theta_{Ab}$ by the extension and contraction of the suspension device 10 is expressed with the following equation (7), as illustrated in FIG. 9.

$$\theta_{Ab} = -\alpha_\theta(Z_A - Z_B) \qquad (7)$$

Here, $\alpha_\theta$ is the unsprung pitch angle per unit stroke amount of the suspension device 10.

According to the equation (6) and the equation (7), the angular speed fluctuation of the unsprung pitch angle $\theta_A$ (derivative value of the unsprung pitch angle $\theta_A$) is expressed with the following [Formula 8].

$$\dot{\theta}_A = \dot{\theta}_{BG} + \alpha_\theta(\dot{Z}_A - \dot{Z}_B) \qquad \text{[Formula 8]}$$

A wheel speed fluctuation amount $\Delta\omega$ will now be described. The wheel speed fluctuation amount $\Delta\omega$ is the fluctuation amount of the wheel speed detected by the wheel speed detection unit 4. The wheel speed fluctuation amount $\Delta\omega$ is expressed with the following [Formula 9]. The wheel speed detected by the wheel speed detection unit 4 not only includes the rotation speed component by the relative movement in the front and back direction with respect to the road surface, but also includes the rotation speed component by the change in the unsprung pitch angle $\theta_A$. In other words, the wheel speed fluctuation amount $\Delta\omega$ is the difference of the tire rotation speed fluctuation amount $\omega$ and the angular speed fluctuation of the unsprung pitch angle $\theta_A$ as expressed in the [Formula 9]. The ECU 1 includes a wheel speed fluctuation amount estimation unit for calculating the wheel speed fluctuation amount $\Delta\omega$ by excluding the wheel speed corresponding to the current vehicle speed from the wheel speed detected by the wheel speed detection unit 4.

$$\Delta\omega = \omega - \dot{\theta}_A \qquad \text{[Formula 9]}$$

[Formula 10] is derived by substituting the [Formula 7] and the [Formula 8] to the [Formula 9].

$$\Delta\omega = [-\dot{\theta}_{BG}H + \dot{X}_{BG} + \dot{\psi}_{BG}W) + \alpha_x(\dot{Z}_A - \dot{Z}_B)]/r - [\dot{\theta}_{BG} + \alpha_\theta(\dot{Z}_A - \dot{Z}_B)] \qquad \text{[Formula 10]}$$

The up-down displacement fluctuation amount will now be described. The up-down displacement fluctuation amount $Z_B$ of the sprung portion at the axle position TC can be expressed with equation (8). The first term on the right side of the equation (8) is the up-down displacement fluctuation amount of the gravity center position PG of the sprung portion. The second term on the right side of the equation (8) is the up-down displacement fluctuation amount (approximate value) by the pitching of the sprung portion. The third term on the right side of the equation (8) is the up and down displacement fluctuation amount (approximate value) by the roll of the sprung portion.

$$Z_B = Z_{BG} \pm L \times \theta_{BG} \pm W \times \phi_{BG} \qquad (8)$$

Here, L is the distance between the axle position TC and the gravity center position PG in the front and back direction of the vehicle (see FIG. 4), and $\phi_{BG}$ is the sprung roll angle. For the distance L between the axle position TC and the gravity center position PG, the distance $L_F$ in the case of the front wheels 2FR, 2FL and the distance $L_R$ in the case of the rear wheels 2RR, 2RL may take different values.

Describing the front right wheel 2FR for the equation (8), the up-down displacement fluctuation amount $Z_{B1}$ of the sprung portion at the axle position TC of the front right wheel 2FR can be obtained by adding or subtracting the up-down displacement fluctuation amount by the pitching of the sprung portion and the up-down displacement fluctuation amount by the roll of the sprung portion with respect to the up-down displacement fluctuation amount $Z_{BG}$ of the gravity center position PG. For example, when the sprung portion is pitched such that the front wheel side sinks in, the up-down displacement fluctuation amount ($L \times \theta_{BG}$) by the pitching of the sprung portion is subtracted from the up-down displacement fluctuation amount $Z_{BG}$ of the gravity center position PG. When the sprung portion is rolled such that the right side of the vehicle sinks in, the up-down displacement fluctuation amount ($W \times \phi_{BG}$) by the roll of the sprung portion is subtracted.

On the contrary, when the sprung portion is pitched such that the front wheel side lifts up, the up-down displacement fluctuation amount ($L \times \theta_{BG}$) by the pitching of the sprung portion is added to the up-down displacement fluctuation amount $Z_{BG}$ of the gravity center position PG. When the sprung portion is rolled such that the right side of the vehicle lifts up, the up-down displacement fluctuation amount ($W \times \phi_{BG}$) by the roll of the sprung portion is added. With respect to the other wheels 2FL, 2RR, 2RL as well, the up-down displacement fluctuation amount $Z_B$ of the sprung portion at the axle position TC is similarly calculated.

According to the equation (8), the up-down displacement fluctuating speed of the sprung portion at the axle position TC is expressed with [Formula 11].

$$\dot{Z}_B = \dot{Z}_{BG} \mp L\dot{\theta}_{BG} \mp W\dot{\phi}_{BG} \qquad \text{[Formula 11]}$$

Expanding the [Formula 11] from the [Formula 6], and notating the wheel speed fluctuation amounts for the four wheels in a matrix form, the following [Formula 12] is obtained. The matrix [D] indicates the following [Formula 13], the matrix [G] indicates the following [Formula 14], the matrix [E] indicates the following [Formula 15], the matrix [F] indicates the following [Formula 16], and the matrix [C] indicates the following [Formula 17].

[Formula 12]
$$\begin{pmatrix} \Delta\omega_1 \\ \Delta\omega_2 \\ \Delta\omega_3 \\ \Delta\omega_4 \end{pmatrix} =$$

$$\begin{pmatrix} \omega_1 - \theta_{A1}s \\ \omega_2 - \theta_{A2}s \\ \omega_3 - \theta_{A3}s \\ \omega_4 - \theta_{A4}s \end{pmatrix} = D \begin{pmatrix} \dot{Z}_{BG} \\ \dot{\theta}_{BG} \\ \dot{X}_{BG} \\ \dot{Y}_{BG} \\ \dot{\varphi}_{BG} \\ \dot{\psi}_{BG} \end{pmatrix} - G \begin{pmatrix} \dot{Z}_{BG} \\ \dot{\theta}_{BG} \\ \dot{X}_{BG} \\ \dot{Y}_{BG} \\ \dot{\varphi}_{BG} \\ \dot{\psi}_{BG} \end{pmatrix} + E \begin{pmatrix} \dot{Z}_{A1} - \dot{Z}_{B1} \\ \dot{Z}_{A2} - \dot{Z}_{B2} \\ \dot{Z}_{A3} - \dot{Z}_{B3} \\ \dot{Z}_{A4} - \dot{Z}_{B4} \end{pmatrix} -$$

$$F \begin{pmatrix} \dot{Z}_{A1} - \dot{Z}_{B1} \\ \dot{Z}_{A2} - \dot{Z}_{B2} \\ \dot{Z}_{A3} - \dot{Z}_{B3} \\ \dot{Z}_{A4} - \dot{Z}_{B4} \end{pmatrix} = (D - G) \begin{pmatrix} \dot{Z}_{BG} \\ \dot{\theta}_{BG} \\ \dot{X}_{BG} \\ \dot{Y}_{BG} \\ \dot{\varphi}_{BG} \\ \dot{\psi}_{BG} \end{pmatrix} - (E - F) \begin{pmatrix} \dot{Z}_{B1} \\ \dot{Z}_{B2} \\ \dot{Z}_{B3} \\ \dot{Z}_{B4} \end{pmatrix} +$$

$$(E - F) \begin{pmatrix} \dot{Z}_{A1} \\ \dot{Z}_{A2} \\ \dot{Z}_{A3} \\ \dot{Z}_{A4} \end{pmatrix} = (D - G) \begin{pmatrix} \dot{Z}_{BG} \\ \dot{\theta}_{BG} \\ \dot{X}_{BG} \\ \dot{Y}_{BG} \\ \dot{\varphi}_{BG} \\ \dot{\psi}_{BG} \end{pmatrix} -$$

$$(E - F)C \begin{pmatrix} \dot{Z}_{BG} \\ \dot{\theta}_{BG} \\ \dot{X}_{BG} \\ \dot{Y}_{BG} \\ \dot{\varphi}_{BG} \\ \dot{\psi}_{BG} \end{pmatrix} + (E - F) \begin{pmatrix} \dot{Z}_{A1} \\ \dot{Z}_{A2} \\ \dot{Z}_{A3} \\ \dot{Z}_{A4} \end{pmatrix} =$$

$$\{(D - G) - (E - F)C\} \begin{pmatrix} \dot{Z}_{BG} \\ \dot{\theta}_{BG} \\ \dot{X}_{BG} \\ \dot{Y}_{BG} \\ \dot{\varphi}_{BG} \\ \dot{\psi}_{BG} \end{pmatrix} + (E - F) \begin{pmatrix} \dot{Z}_{A1} \\ \dot{Z}_{A2} \\ \dot{Z}_{A3} \\ \dot{Z}_{A4} \end{pmatrix}$$

[Formula 13]
$$[D] = \begin{pmatrix} 0 & -H_F/r_F & 1/r_F & 0 & 0 & W_F/r_F \\ 0 & -H_F/r_F & 1/r_F & 0 & 0 & -W_F/r_F \\ 0 & -H_R/r_R & 1/r_R & 0 & 0 & W_R/r_R \\ 0 & -H_R/r_R & 1/r_R & 0 & 0 & -W_R/r_R \end{pmatrix}$$

[Formula 14]
$$[G] = \begin{pmatrix} 0 & 1 & 0 & 0 & 0 & 0 \\ 0 & 1 & 0 & 0 & 0 & 0 \\ 0 & 1 & 0 & 0 & 0 & 0 \\ 0 & 1 & 0 & 0 & 0 & 0 \end{pmatrix}$$

[Formula 15]
$$[E] = \begin{pmatrix} \alpha_{XF}/r_F & 0 & 0 & 0 \\ 0 & \alpha_{XF}/r_F & 0 & 0 \\ 0 & 0 & \alpha_{XF}/r_R & 0 \\ 0 & 0 & 0 & \alpha_{XF}/r_R \end{pmatrix}$$

[Formula 16]
$$[F] = \begin{pmatrix} \alpha_{\theta F} & 0 & 0 & 0 \\ 0 & \alpha_{\theta F} & 0 & 0 \\ 0 & 0 & \alpha_{\theta R} & 0 \\ 0 & 0 & 0 & \alpha_{\theta R} \end{pmatrix}$$

[Formula 17]
$$[C] = \begin{pmatrix} 1 & -L_F & 0 & 0 & -W_F & 0 \\ 1 & -L_F & 0 & 0 & W_F & 0 \\ 1 & L_R & 0 & 0 & -W_R & 0 \\ 1 & L_R & 0 & 0 & W_R & 0 \end{pmatrix}$$

Here, $\Delta\omega_1$ is the wheel speed fluctuation amount of the front right wheel 2FR, $\Delta\omega_2$ is the wheel speed fluctuation amount of the front left wheel 2FL, $\omega_3$ is the wheel speed fluctuation amount of the rear right wheel 2RR, and $\Delta\omega_4$ is the wheel speed fluctuation amount of the rear left wheel 2RL. In other words, the suffix 1 of each variable indicates a value related to the front right wheel 2FR, the suffix 2 indicates a value related to the front left wheel 2FL, the suffix 3 indicates a value related to the rear right wheel 2RR, and the suffix 4 indicates a value related to the rear left wheel 2RL.

The other variables are as follows.

$\omega_1, \omega_2, \omega_3, \omega_4$: tire rotation speed fluctuation amount of each wheel 2 of front right, front left, rear right, rear left $\theta_{A1}, \theta_{A2}, \theta_{A3}, \theta_{A4}$ unsprung pitch angle at the position of each wheel 2 of front right, front left, rear right, rear left $X_{A1}, X_{A2}, X_{A3}, X_{A4}$: unsprung front-back displacement fluctuation amount of each wheel 2 of front right, front left, rear right, rear left $X_{B1}, X_{B2}, X_{B3}, X_{B4}$: front-back displacement fluctuation amount of the sprung portion at the axle position TC of each wheel 2 of front right, front left, rear right, rear left $Z_{A1}, Z_{A2}, Z_{A3}, Z_{A4}$: up-down displacement fluctuation amount of the unsprung portion of each wheel 2 of front right, front left, rear right, rear left $Z_{B1}, Z_{B2}, Z_{B3}, Z_{B4}$: up-down displacement fluctuation amount of the sprung portion at the axle position TC of each wheel 2 of front right, front left, rear right, rear left $Y_{BG}$: left-right displacement fluctuation amount of the gravity center position PG of the sprung portion $r_F$: radius of the front wheel 2FR, 2FL $r_R$: radius of the rear wheel 2RR, 2RL $L_F$: distance in the front and back direction of the vehicle of the axle position TC and the gravity center position PG of the front wheel 2FR, 2FL $L_R$: distance in the front and back direction of the vehicle of the axle position TC and the gravity center position PG of the rear wheel 2RR, 2RL $W_F$: distance in the left and right direction (vehicle width direction) of the axle position TC and the gravity center position PG of the front wheel 2FR, 2FL $W_R$: distance in the left and right direction (vehicle width direction) of the axle position TC and the gravity center position PG of the rear wheel 2RR, 2RL $H_F$: distance in the up and down direction of the axle position TC and the gravity center position PG of the front wheel 2FR, 2FL $H_R$: distance in the up and down direction of the axle position TC and the gravity center position PG of the rear wheel 2RR, 2RL $\alpha_{XF}$: relative displacement amount in the front and back direction of the vehicle of the sprung portion and the unsprung portion at each front wheel 2FR, 2FL per unit stroke amount of the suspension device 10FR, FL $\alpha_{XR}$: relative displacement amount in the front and back direction of the vehicle of the sprung portion and the unsprung portion at each rear wheel 2RR, 2RL per unit stroke amount of the suspension device 10RR, RL $\alpha_{\theta F}$: unsprung pitch angle at each front wheel 2FR, 2FL per unit stroke amount of the suspension device 10FR, FL $\alpha_{\theta R}$: unsprung pitch angle at each rear wheel 2RR, 2RL per unit stroke amount of the suspension device 10RR, RL Developing the [Formula 12], [Formula 18] is obtained.

[Formula 18]

$$\begin{pmatrix} \Delta\omega_1 \\ \Delta\omega_2 \\ \Delta\omega_3 \\ \Delta\omega_4 \end{pmatrix} = [(D-G)-(E-F)C]\begin{pmatrix} \dot{Z}_{BG} \\ \theta_{BG} \\ \dot{X}_{BG} \\ \dot{Y}_{BG} \\ \dot{\varphi}_{BG} \\ \dot{\psi}_{BG} \end{pmatrix} + (E-F)\begin{pmatrix} \dot{Z}_{A1} \\ \dot{Z}_{A2} \\ \dot{Z}_{A3} \\ \dot{Z}_{A4} \end{pmatrix} =$$

$$\begin{pmatrix} \alpha_{XF}/r_F+\alpha_{\theta F} & -H_F/r_F & -1+(\alpha_{XF}/r_F-\alpha_{\theta F})L_F & 1/r_F & 0 & +(\alpha_{XF}/r_F-\alpha_{\theta F})W_F & W_F/r_F \\ \alpha_{XF}/r_F+\alpha_{\theta F} & -H_F/r_F & -1+(\alpha_{XF}/r_F-\alpha_{\theta F})L_F & 1/r_F & 0 & -(\alpha_{XF}/r_F-\alpha_{\theta F})W_F & -W_F/r_F \\ \alpha_{XR}/r_R+\alpha_{\theta R} & -H_F/r_F & -1+(\alpha_{XF}/r_F-\alpha_{\theta F})L_F & 1/r_R & 0 & +(\alpha_{XR}/r_R-\alpha_{\theta R})W_R & W_R/r_R \\ \alpha_{XR}/r_R+\alpha_{\theta R} & -H_F/r_F & -1+(\alpha_{XF}/r_F-\alpha_{\theta F})L_F & 1/r_R & 0 & -(\alpha_{XR}/r_R-\alpha_{\theta R})W_R & -W_R/r_R \end{pmatrix}$$

$$\begin{pmatrix} \dot{Z}_{BG} \\ \theta_{BG} \\ \dot{X}_{BG} \\ \dot{Y}_{BG} \\ \dot{\varphi}_{BG} \\ \dot{\psi}_{BG} \end{pmatrix} + \begin{pmatrix} \alpha_{XF}/r_F-\alpha_{\theta F} & 0 & 0 & 0 \\ 0 & \alpha_{XF}/r_F-\alpha_{\theta F} & 0 & 0 \\ 0 & 0 & \alpha_{XR}/r_R-\alpha_{\theta R} & 0 \\ 0 & 0 & 0 & \alpha_{XR}/r_R-\alpha_{\theta R} \end{pmatrix}\begin{pmatrix} \dot{Z}_{A1} \\ \dot{Z}_{A2} \\ \dot{Z}_{A3} \\ \dot{Z}_{A4} \end{pmatrix}$$

$\Delta\omega_1$ to $\Delta\omega_4$ each indicates the wheel speed of each wheel 2 of front right, front left, rear right, and rear left. The matrix [D] indicates the [Formula 13], the matrix [G] indicates the [Formula 14], the matrix [E] indicates the [Formula 15], the matrix [F] indicates the [Formula 16], and the matrix [C] indicates the [Formula 17]. $Z_{BG}$, $\theta_{BG}$, $X_{BG}$, $Y_{BG}$, $\phi_{BG}$, $\Psi_{BG}$ each indicates the up-down displacement fluctuation amount of the sprung portion for each of the six directions, that is, the up-down direction ($Z_{BG}$), the sprung pitch angle direction ($\theta_{BG}$), the vehicle front-back direction ($X_{BG}$), the vehicle left-right direction ($Y_{BG}$), the sprung roll angle direction ($\phi_{BG}$) and the sprung yaw angle direction ($\Psi_{BG}$). $Z_{A1}$ to $Z_{A4}$ each indicates the up-down displacement fluctuation amount of the unsprung portion of each wheel of front right FR, front left FL, rear right RR, and rear left RL.

The wheel speed "$\Delta\omega_F=(-\Delta\omega_1+\Delta\omega_2)/2$" of the reverse phase of the left and right wheels of the front wheel position and the wheel speed "$\Delta\omega_R=(-\Delta\omega_3+\Delta\omega_4)/2$" of the reverse phase of the left and right wheels of the rear wheel position are obtained from the wheel speed fluctuation amount $\{\Delta\omega_1, \Delta\omega_2, \Delta\omega_3, \Delta\omega_4\}$ for the four wheels indicated in the [Formula 18].

The wheel speed "$\Delta\omega_F=(-\Delta\omega_1+\Delta\omega_2)/2$" of the reverse phase of the left and right wheels of the front wheel position is a value obtained by dividing the difference of the wheel speed $\Delta\omega_1$ of the front right FR and the wheel speed $\Delta\omega_2$ of the front left FL by two, and is specifically, a value obtained by dividing a difference of the first row and the second row from the top of the matrix of four rows of the [Formula 18] by two. The wheel speed "$\Delta\omega_R=(-\Delta\omega_3+\Delta\omega_4)/2$" of the reverse phase of the left and right wheels of the rear wheel position is a value obtained by dividing the difference of the wheel speed $\Delta\omega_3$ of the rear right RR and the wheel speed $\Delta\omega_4$ of the rear left RL by two, and is specifically, a value obtained by dividing a difference of the third row and the fourth row from the top of the matrix of four rows of the [Formula 18] by two.

$Z_{BG}=\theta_{BG}=X_{BG}=0$ is obtained for the reverse phase inputs of the left and right wheels, where the [Formula 19] is obtained by computing the reverse phase components of the left and right wheel from the difference of the first row and the second row, and the third row and the fourth row of the [Formula 18] taking into consideration that $\Psi_{BG}\approx 0$ at the time of straight advancement.

[Formula 19]

$$\Delta\omega_F = \frac{-\Delta\omega_1+\Delta\omega_2}{2} = -(\alpha_{XF}/r_F-\alpha_{\theta F})W_F\dot{\varphi}_{BG} +$$

$$(\alpha_{XF}/r_F-\alpha_{\theta F})\left(\frac{-\dot{Z}_{A1}+\dot{Z}_{A2}}{2}\right)$$

$$\Delta\omega_R = \frac{-\Delta\omega_3+\Delta\omega_4}{2} = -(\alpha_{XR}/r_R-\alpha_{\theta R})W_R\dot{\varphi}_{BG} +$$

$$(\alpha_{XR}/r_R-\alpha_{\theta R})\left(\frac{-\dot{Z}_{A3}+\dot{Z}_{A4}}{2}\right)$$

Specifically, considering the reverse phase inputs of the left and right wheels, there are six movements $\{Z_{BG}, \theta_{BG}, X_{BG}, Y_{BG}, \phi_{BG}, \Psi_{BG}\}$ for the sprung portion, as indicated in the [Formula 18], where three movements $\{Z_{BG}, \theta_{BG}, X_{BG}\}$ no longer occur. This is because when the reverse phase inputs of the left and right wheels are taken into consideration, the position at the middle of the vehicle 100 does not move up and down, and also does not move in the pitching direction nor the front and back direction. Thus, the movement of the sprung portion for the up and down direction ($Z_{BG}$), the sprung pitch angle direction ($\theta_{BG}$), and the vehicle front-back direction ($X_{BG}$) can be assumed to be zero. Three movements of the sprung portion of the vehicle left-right direction ($Y_{BG}$), the sprung roll angle direction ($\phi_{BG}$) and the sprung yaw angle direction ($T_{BG}$) thus occur in the reverse phase inputs. Furthermore, the movement in four directions of the road surface input is also very small, and hence the sprung yaw angle direction ($\Psi_{BG}$) can also be assumed to be zero. Therefore, four $\{Z_{BG}, \theta_{BG}, X_{BG}, \omega_{BG}\}$ of the six $\{Z_{BG}, \theta_{BG}, X_{BG}, Y_{BG}, \phi_{BG}, \Psi_{BG}\}$ movements of the sprung portion indicated in the [Formula 18] can be assumed to be zero. Thus, the wheel speed "$\Delta\omega_F = (-\Delta\omega_1 + \Delta\omega_2)/2$" of the reverse phase of the left and right wheels of the front wheel position and the wheel speed "$\Delta\omega_R = (-\Delta\omega_3 + \Delta\omega_4)/2$" of the reverse phase of the left and right wheels of the rear wheel position can be respectively expressed as the [Formula 19].

In the [Formula 19], the number of unknowns is three $\phi_{BG}$, $\{(-Z_{A1} + Z_{A2})/2\}$, and $\{(-Z_{A3} + Z_{A4})/2\}$. In the [Formula 19], two equations exist for the three unknowns, and hence the number of unknowns needs to be reduced by one so that the number of unknowns becomes two.

The front wheel input and the rear wheel input have an input time difference of the wheel base L/vehicle speed U, $\{(-Z_{A1} + Z_{A2})/2\}$ and $\{(-Z_{A3} + Z_{A4})/2\}$ of the unknowns in the [Formula 19] can be respectively replaced with "$Z_{AF}$" and "$Z_{AF}e^{-(L/U \cdot s)}$", as indicated in the [Formula 20], taking such input time difference into consideration.

$$\Delta\omega_F = -(\alpha_{XF}/r_F - \alpha_{\theta F})W_F \dot{\phi}_{BG} + (\alpha_{XF}/r_F - \alpha_{\theta F})\dot{Z}_{AF} \quad \text{[Formula 20]}$$

$$\Delta\omega_R = -(\alpha_{XR}/r_R - \alpha_{\theta R})W_R \dot{\phi}_{BG} + (\alpha_{XR}/r_R - \alpha_{\theta R})\dot{Z}_{AF} e^{-\frac{L}{U}s}$$

$$\text{Where } \dot{Z}_{AF} = \frac{-\dot{Z}_{A1} + \dot{Z}_{A2}}{2}, \quad \dot{Z}_{AR} = \frac{-\dot{Z}_{A3} + \dot{Z}_{A4}}{2} \cong \dot{Z}_{AF} e^{-\frac{L}{U}s}$$

In the [Formula 20], the number of unknowns is two, $\phi_{BG}$ and $Z_{AF}$. In the [Formula 20], two equations exist for the two unknowns, and thus when each unknown is obtained from the [Formula 20], the reverse phase component $Z_{AF}$ of the left and right wheels of the up-down speed of the unsprung portion of the front wheel, the reverse phase component $Z_{AR}$ of the left and right wheels of the up-down speed of the unsprung portion of the rear wheel, and the sprung roll angular speed $\dot{\phi}_{BG}$ are respectively expressed with the following [Formula 21], [Formula 22], and [Formula 23]. As a result, the state amount of the unsprung portion and the sprung portion (roll) can be estimated without using a vehicle model.

$$\dot{Z}_{AF} = \frac{\frac{\Delta\omega_F}{W_F(\alpha_{XF}/r_F - \alpha_{\theta F})} - \frac{\Delta\omega_R}{W_R(\alpha_{XR}/r_R - \alpha_{\theta R})}}{\frac{1}{W_F} - \frac{1}{W_R}e^{-\frac{L}{U}s}} \quad \text{[Formula 21]}$$

$$\dot{Z}_{AR} = \dot{Z}_{AF} e^{-\frac{L}{U}s} \quad \text{[Formula 22]}$$

$$\dot{\phi}_{BG} = \frac{(\alpha_{XF}/r_F - \alpha_{\theta F})\dot{Z}_{AF} - \Delta\omega_F}{W_F(\alpha_{XF}/r_F - \alpha_{\theta F})} \quad \text{[Formula 23]}$$

As described above, the state amount estimation unit 21 converts, for the wheel speed of the reverse phase of the left and right wheels, the [Formula 19] representing the wheel speed "$\Delta\omega_F = (-\omega_1 + \Delta\omega_2)/2$" of the reverse phase of the left and right wheels of the front wheel position and the wheel speed "$\Delta\omega_R = (-\Delta\omega_3 + \Delta\omega_4)/2$" of the reverse phase of the left and right wheels of the rear wheel position to the [Formula 20] using the value "L/U" obtained by dividing the wheel base L of the predetermined front-rear wheel by the vehicle speed U. The state amount estimation unit 21 estimates the up-down displacement "$Z_{AF}$" of the reverse phase of the left and right wheels of the unsprung portion of the front wheel of the vehicle 100 indicated in the [Formula 21] and the up-down displacement "$Z_{AR}$" of the reverse phase of the left and right wheels of the unsprung portion of the rear wheel of the vehicle 100 indicated in the [Formula 22] from the [Formula 20] as the unsprung state amount. Furthermore, the state amount estimation unit 21 estimates the sprung roll angle "$\omega_{BG}$" of the vehicle 100 indicated in the [Formula 23] as the sprung state amount.

Thus, the state amount estimation unit 21 of the present embodiment can estimate the unsprung•sprung behavior based on the wheel speed "½·($\Delta\omega R - \Delta\omega L$)" of the reverse phase of the left and right wheels, and the wheel base/vehicle speed "L/U" of the front and rear wheels. The estimating method by the state amount estimation unit 21 is the estimating method based on the wheel speed of the reverse phase of the left and right wheels that is not correlated with the sprung up-down displacement fluctuation ($Z_{BG}$)•sprung pitch angle ($\theta_{BG}$)•sprung front-back displacement fluctuation ($X_{BG}$), which change by the vehicle properties, and thus the unsprung•sprung behavior can be estimated with high accuracy without depending on the change in the vehicle properties. Actually, the "up-down displacement of the reverse phase of the left and right wheels of the unsprung portion of the front wheel" can be estimated by the [Formula 21], the "up-down displacement of the reverse phase of the left and right wheels of the unsprung portion of the rear wheel" can be estimated by the [Formula 22], and the "sprung roll angle" can be estimated by the [Formula 23].

The correspondence relationship, and the like of the estimating method of the vehicle state by the vehicle state estimating device 101 according to the present embodiment and the theoretical formula will now be described. The correspondence of the theoretical formulas [Formula 21], [Formula 22], and [Formula 23], and the block diagram of FIG. 2 is illustrated in FIG. 10.

In the portion corresponding to the [Formula 21] of FIG. 10, the estimation unit 21g of the state amount estimation unit 21 subtracts the value "$\{(-\Delta\omega_3 + \Delta\omega_4)/2\} \cdot \{1/(W_R(\alpha_{XR}/r_R - \alpha_{\theta R}))\}$" obtained by the estimation unit 21f of the state amount estimation unit 21 from the value "$\{(-\Delta\omega_1 + \Delta\omega_2)/2\} \cdot \{1/(W_F(\alpha_{XF}/r_F - \alpha_{\theta R}))\}$" obtained by the estimation unit 21c of the state amount estimation unit 21. The estimation unit 21h of the state amount estimation unit 21 multiplies "$1/\{(1/W_F) - (1/W_R)e^{-L/U \cdot s}\}$" to the value obtained by the estimation unit 21g to obtain the up-down displacement ($Z_{AF}$) of the reverse phase of the left and right wheels of the unsprung portion of the front wheel of the vehicle 100 as the unsprung state amount of the vehicle 100. The obtained up-down displacement ($Z_{AF}$) of the reverse phase of the left and right wheels of the unsprung portion of the front wheel of the vehicle 100 is indicated in the [Formula 21].

In the portion corresponding to the [Formula 22] of FIG. 10, the estimation unit 21i of the state amount estimation unit 21 multiplies "$e^{-L/U \cdot s}$" to the value obtained by the estimation unit 21h to obtain the up-down displacement ($Z_{AR}$) of the reverse phase of the left and right wheels of the unsprung portion of the rear wheel of the vehicle 100 as the unsprung state amount of the vehicle 100. The obtained up-down displacement ($Z_{AR}$) of the reverse phase of the left and right wheels of the unsprung portion of the rear wheel of the vehicle 100 is indicated in the [Formula 22].

In the portion corresponding to the [Formula 23] of FIG. 10, the estimation unit $21j$ of the state amount estimation unit 21 subtracts the value obtained by the estimation unit $21c$ from the value obtained by multiplying "$1/W_F$" to the value obtained by the estimation unit $21h$ to obtain the sprung roll angle (($P_{BG}$) of the vehicle 100 as the sprung state amount of the vehicle 100. The obtained sprung roll angle ($\phi_{BG}$) of the vehicle 100 is indicated in the [Formula 23].

In the present embodiment, the vehicle state estimating device 101 further includes a load state estimation unit that calculates the roll resonance frequency ($\omega_n$) and the maximum value (p) of the transfer function of the sprung state amount with respect to the unsprung state amount based on the up-down displacement ($Z_{AF}$) of the reverse phase of the left and right wheels of the unsprung portion of the front wheel, the up-down displacement ($Z_{AR}$) of the reverse phase of the left and right wheels of the unsprung portion of the rear wheel, and the sprung roll angle ($\phi_{BG}$) estimated by the state amount estimation unit 21, and estimates the load state of the vehicle 100 based on the calculated roll resonance frequency ($\omega_n$) and the maximum value (p) of the transfer function. In the present embodiment, the load state of the vehicle 100 includes a load capacity (M) and a sprung gravity center height (H).

Specifically, the load state estimation unit computes the transfer function of the sprung portion (roll) with respect to the unsprung portion based on the up-down displacement ($Z_{AF}$, $Z_{AR}$) of the reverse phase of the left-right wheel of the unsprung portion and the sprung roll angle ($\phi_{BG}$), as indicated in the [Formula 24].

$$\begin{pmatrix} \dfrac{\partial \varphi_{BG}}{\partial Z_{AF}} \\ \dfrac{\partial \varphi_{BG}}{\partial Z_{AR}} \end{pmatrix} = \begin{pmatrix} \sum_{j=1}^{N} Z_{AF} Z_{AF}^{*} & \sum_{j=1}^{N} Z_{AR} Z_{AF}^{*} \\ \sum_{j=1}^{N} Z_{AF} Z_{AR}^{*} & \sum_{j=1}^{N} Z_{AR} Z_{AR}^{*} \end{pmatrix}^{-1} \begin{pmatrix} \sum_{j=1}^{N} Z_{AF}^{*} \varphi_{BG} \\ \sum_{j=1}^{N} Z_{AR}^{*} \varphi_{BG} \end{pmatrix} \quad \text{[Formula 24]}$$

The term ($\partial \phi_{BG}/\partial Z_{AF}$) at the top on the left side of the [Formula 24] represents the movement of the roll of the vehicle 100 by only the front wheel input. The term ($\partial \phi_{BG}/\partial Z_{AR}$) at the bottom on the left side of the [Formula 24] represents the movement of the roll of the vehicle 100 by only the rear wheel input. $\partial$ on the left side of the [Formula 24] indicates a partial differentiation symbol. In the transfer function indicated in the [Formula 24], the vehicle 100 rolls even with the road surface input of the front wheel, and the vehicle 100 also rolls even with the road surface input of the rear wheel, and thus the movement of the roll of the vehicle 100 is expressed with the equation of multiple linear regression analysis in a form of combining the two inputs. The calculation concept of the transfer function indicated in the [Formula 24] follows the document "Analysis method of gravity center position of vehicle during actual traveling" by Tsuyoshi Yoshimi; Shingo Koumura; Takahiro Shionoya; Report of JSAE Congress (spring); No. 69-13; pgs. 27-32; published May 22, 2013".

The load state estimation unit estimates the load state from the relationship of the resonance frequency ($\omega_n$), the maximum value (p), and the like of the transfer function determined from the computed transfer function indicated in the [Formula 24] with the load state. As illustrated in FIG. 11, the roll resonance frequency ($\omega_n$) becomes low when the load capacity is increased and the gravity center height is raised, and the roll resonance frequency ($\omega_n$) becomes high when the load capacity is reduced and the gravity center height is lowered. Furthermore, as illustrated in FIG. 12, the maximum value (p) of the transfer function becomes small when the load capacity is increased and the gravity center height is raised, and the maximum value (p) of the transfer function becomes large when the load capacity is reduced and the gravity center height is lowered. When the roll resonance frequency ($\omega_n$) and the maximum value (p) of the transfer function illustrated in FIGS. 11 and 12 are mathematized to the relationship of the load capacity (M) and the gravity center height (H), the following [Formula 25] is obtained.

$$\omega_n = \omega_{n0} + \frac{\partial \omega_n}{\partial M} M + \frac{\partial \omega_n}{\partial H} H \quad \text{[Equation 25]}$$

$$p = p_0 + \frac{\partial p}{\partial M} M + \frac{\partial p}{\partial H} H$$

In the [Formula 25], $\omega_n$ is the roll resonance frequency, p is the maximum value of the transfer function, M is the load capacity, H is the sprung gravity center height (difference with time of empty vehicle), $\partial \omega_n/\partial M$ is the sensitivity of the roll resonance frequency with respect to the load capacity, $\partial \omega_n/\partial H$ is the sensitivity of the roll resonance frequency with respect to the gravity center height, $\partial p/\partial M$ is the sensitivity of the maximum value of the transfer function with respect to the load capacity, $\partial p/\partial H$ is the sensitivity of the maximum value of the transfer function with respect to the gravity center height, $\omega_{n0}$ is the roll resonance frequency at the time of empty vehicle, and $p_0$ is the maximum value of the transfer function at the time of empty vehicle.

The load state estimation unit estimates by back calculating the load capacity (M) and the sprung gravity center height (H) as the load state of the vehicle 100, as indicated in the [Formula 26] using the [Formula 25] from the roll resonance frequency ($\omega_n$) and the maximum value (p) of the transfer function of the transfer function calculated in the [Formula 24].

$$\begin{pmatrix} M \\ H \end{pmatrix} = \begin{pmatrix} \dfrac{\partial \omega_n}{\partial M} & \dfrac{\partial \omega_n}{\partial H} \\ \dfrac{\partial p}{\partial M} & \dfrac{\partial p}{\partial H} \end{pmatrix}^{-1} \begin{pmatrix} \omega_n - \omega_{n0} \\ p - p_0 \end{pmatrix} \quad \text{[Formula 26]}$$

Therefore, the load state estimation unit of the present embodiment can estimate the load state (load capacity (M) and sprung gravity center height (H)) based on the roll resonance frequency ($\omega_n$) and the maximum value (p) of the transfer function of the sprung portion with respect to the unsprung portion computed from the up-down displacement ($Z_{AF}$) of the reverse phase of the left and right wheels of the unsprung portion of the front wheel, the up-down displacement ($Z_{AR}$) of the reverse phase of the left and right wheels of the unsprung portion of the rear wheel, and the sprung roll angle ($\phi_{BG}$). Therefore, according to the present embodiment, the load state of the vehicle 100 can be estimated with high accuracy from the detected wheel speed and the vehicle speed without using an additional sensor, and the like.

Furthermore, in the present embodiment, the vehicle control device 102 includes a control unit that controls the suspension device 10 of the vehicle 100 based on the unsprung state amount (the up-down displacement ($Z_{AF}$) of the reverse phase of the left and right wheels of the unsprung portion of the front wheel and the up-down displacement ($Z_{AR}$) of the reverse phase of the left and right wheels of the unsprung portion of the rear wheel) and the sprung state amount (sprung roll angle ($\omega_{BG}$)) estimated by the state amount estimation unit 21. Specifically, the control unit controls the suspension device 10 of the vehicle 100 based on the load state (load capacity (M) and sprung gravity center height (H)) of the vehicle 100 estimated by the load state estimation unit as described above.

As described above, a vehicle state estimating device according to the present invention includes a wheel speed detection unit that detects a wheel speed of each wheel of a vehicle; a vehicle speed detection unit that detects a vehicle speed of the vehicle; and a state amount estimation unit that estimates an unsprung state amount and/or a sprung state amount of the vehicle, based on a wheel speed of reverse phase of left and right wheels based on the wheel speed of each wheel detected by the wheel speed detection unit, and a value obtained by dividing a wheel base of a predetermined front-rear wheel by the vehicle speed detected by the vehicle speed detection unit. According to the vehicle state estimating device of the present invention, the state amount of the vehicle can be estimated with high accuracy from the wheel speed irrespective of the change in the vehicle property.

Further, the vehicle state estimating device 101 and the vehicle control device 102 of the present embodiment can execute the vehicle state estimating method described below.

The vehicle state estimating method executed by the vehicle state estimating device 101 and the vehicle control device 102 includes a wheel speed detecting step of detecting a wheel speed of each wheel of the vehicle 100; a vehicle speed detecting step of detecting a vehicle speed of the vehicle 100; and a state amount estimating step of estimating an unsprung state amount and/or a sprung state amount of the vehicle 100, based on the wheel speed of reverse phase of the left and right wheels based on the wheel speed of each wheel detected in the wheel speed detecting step, and a value obtained by dividing the wheel base of a predetermined front-rear wheel by the vehicle speed of the vehicle 100 detected in the vehicle speed detecting step. The vehicle state estimating method further includes a load state estimating step of (i) calculating the roll resonance frequency and the maximum value of the transfer function of the sprung state amount with respect to the unsprung state amount, based on the up-down displacement of the reverse phase of the left and right wheels of the unsprung portion of the front wheel, the up-down displacement of the reverse phase of the left and right wheels of the unsprung portion of the rear wheel, and the sprung roll angle which are estimated in the state amount estimating step, and (ii) estimating the load state of the vehicle 100, based on the calculated roll resonance frequency and the maximum value of the transfer function. In the present embodiment, the wheel speed detection unit 4 executes the wheel speed detecting step. The state amount estimation unit 21 executes the state amount estimating step. The load state estimation unit executes the load state estimating step.

In the embodiment described above, the approximate expression is sometimes used in the theoretical formula, but a more detailed (high order) expression may be used instead of the approximate expression. For example, the high-order expression that takes into consideration the deformation of the tire of the wheel 2, and the like may be used.

In the embodiment described above, the ECU 1 serving as the control unit controls the suspension device 10 based on the unsprung state amount and the sprung state amount, but the state amount used in the control is not limited thereto. The control unit may control the suspension device 10 based on at least one of the unsprung state amount and the sprung state amount.

The target of control based on the unsprung state amount and/or the sprung state amount may be other than the suspension device 10. Other devices controlled based on the behavior of the vehicle 100 such as the brake device, the acceleration/deceleration device, and the steering device may be controlled by the control unit.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle state estimating device comprising:
   a wheel speed detector configured to detect a wheel speed of each wheel of a vehicle; and
   a control unit including a processor configured to:
   detect a vehicle speed of the vehicle; and
   estimate an unsprung state amount and/or a sprung state amount of the vehicle, based on a wheel speed of reverse phase of left and right wheels based on the wheel speed of each wheel detected by the wheel speed detector, and a value obtained by dividing a wheel base of a predetermined front-rear wheel by the vehicle speed.

2. The vehicle state estimating device according to claim 1, wherein
   the control unit including the processor is configured to convert, as the wheel speed of the reverse phase of the left and right wheels, Formula (1), which represents a wheel speed of the reverse phase of the left and right wheels at a front wheel position and a wheel speed of the reverse phase of the left and right wheels at a rear wheel position to Formula (2) using the value obtained by dividing the wheel base of the predetermined front-rear wheel by the vehicle speed, (ii) estimate, as the unsprung state amount, an up-down displacement of the reverse phase of the left and right wheels of an unsprung portion of the front wheel of the vehicle indicated in Formula (3) and an up-down displacement of the reverse phase of the left and right wheels of an unsprung portion of the rear wheel of the vehicle indicated in Formula (4), from the Formula (2), and (iii) estimate, as the sprung state amount, a sprung roll angle of the vehicle indicated in Formula (5), wherein:

$$\Delta\omega_F = \frac{-\Delta\omega_1 + \Delta\omega_2}{2} = \qquad(1)$$
$$-(\alpha_{XF}/r_F - \alpha_{\theta F})W_F\dot{\varphi}_{BG} + (\alpha_{XF}/r_F - \alpha_{\theta F})\left(\frac{-\dot{Z}_{A1} + \dot{Z}_{A2}}{2}\right)$$

$$\Delta\omega_R = \frac{-\Delta\omega_3 + \Delta\omega_4}{2} =$$
$$-(\alpha_{XR}/r_R - \alpha_{\theta R})W_R\dot{\varphi}_{BG} + (\alpha_{XR}/r_R - \alpha_{\theta R})\left(\frac{-\dot{Z}_{A3} + \dot{Z}_{A4}}{2}\right)$$

$$\Delta\omega_F = -(\alpha_{XF}/r_F - \alpha_{\theta F})W_F\dot{\varphi}_{BG} + (\alpha_{XF}/r_F - \alpha_{\theta F})\dot{Z}_{AF} \qquad(2)$$
$$\Delta\omega_R = -(\alpha_{XR}/r_R - \alpha_{\theta R})W_R\dot{\varphi}_{BG} + (\alpha_{XR}/r_R - \alpha_{\theta R})\dot{Z}_{AF}e^{-\frac{L}{U}s}$$

$$\text{Where } \dot{Z}_{AF} = \frac{-\dot{Z}_{A1} + \dot{Z}_{A2}}{2}, \; \dot{Z}_{AR} = \frac{-\dot{Z}_{A3} + \dot{Z}_{A4}}{2} \cong \dot{Z}_{AF}e^{-\frac{L}{U}s}$$

$$\dot{Z}_{AF} = \frac{\dfrac{\Delta\omega_F}{W_F(\alpha_{XF}/r_F - \alpha_{\theta F})} - \dfrac{\Delta\omega_R}{W_R(\alpha_{XR}/r_R - \alpha_{\theta R})}}{\dfrac{1}{W_F} - \dfrac{1}{W_R}e^{-\frac{L}{U}s}} \qquad(3)$$

-continued $$\dot{Z}_{AR} = \dot{Z}_{AF} e^{-\frac{L}{U}s} \quad (4)$$

$$\dot{\varphi}_{BG} = \frac{(\alpha_{XF}/r_F - \alpha_{\theta F})\dot{Z}_{AF} - \Delta\omega_F}{W_F(\alpha_{XF}/r_F - \alpha_{\theta F})} \quad (5)$$

wherein in the Formula 1 to the Formula 5, $\Delta\omega_F$: wheel speed of the reverse phase of the left and right wheels at a front wheel position; $\Delta\omega_R$: wheel speed of the reverse phase of the left and right wheels at a rear wheel position; $\Delta\omega_1$: wheel speed of an FR wheel; $\Delta\omega_2$: wheel speed of an FL wheel; $\Delta\omega_3$: wheel speed of an RR wheel; $\Delta\omega_4$: wheel speed of an RL wheel; $\alpha_{XF}$, $\alpha_{XR}$: axle front-back displacement with respect to a suspension up-down stroke; $\alpha_{\theta F}$, $\alpha_{\theta R}$: axle pitch angle with respect to the suspension up-down stroke; $r_F$, $r_R$: tire radius (front wheel, rear wheel); $W_F$, $W_R$: left-right distance (half of trestle) from an axle position to a body gravity center; $\phi_{BG}$: sprung roll angle; $Z_{A1}$ to $Z_{A4}$: up-down displacement fluctuation amount of the unsprung portion of each wheel of front right, front left, rear right, rear left; $Z_{AF}$: up-down displacement of the reverse phase of the left and right wheels of the unsprung portion of the front wheel; $Z_{AR}$: up-down displacement of the reverse phase of the left and right wheels of the unsprung portion of the rear wheel; L: wheel base; U: vehicle speed; and s: Laplace operator.

3. The vehicle state estimating device according to claim 2, wherein
the control unit including the processor is further configured to (i) calculate a roll resonance frequency and a maximum value of a transfer function of the sprung state amount with respect to the unsprung state amount, based on the up-down displacement of the reverse phase of the left and right wheels of the unsprung portion of the front wheel, the up-down displacement of the reverse phase of the left and right wheels of the unsprung portion of the rear wheel, and the sprung roll angle, and (ii) estimate a load state of the vehicle, based on the calculated roll resonance frequency and the maximum value of the transfer function.

4. A vehicle control device comprising:
a wheel speed detector configured to detect a wheel speed of each wheel of a vehicle;
a control unit including a processor configured to:
detect a vehicle speed of the vehicle; and
estimate an unsprung state amount and/or a sprung state amount of the vehicle, based on a wheel speed of reverse phase of left and right wheels based on the wheel speed of each wheel detected by the wheel speed detector, and a value obtained by dividing a wheel base of a predetermined front-rear wheel by the vehicle speed; and
control a suspension device of the vehicle based on the unsprung state amount and/or the sprung state amount.

5. A vehicle state estimating method comprising:
detecting, using a wheel speed detector, a wheel speed of each wheel of a vehicle;
detecting, using a control unit, a vehicle speed of the vehicle; and
estimating, using the control unit, an unsprung state amount and/or a sprung state amount of the vehicle, based on a wheel speed of reverse phase of left and right wheels based on the detected wheel speed of each wheel, and a value obtained by dividing a wheel base of a predetermined front-rear wheel by the detected vehicle speed.

* * * * *